United States Patent
Chang

(10) Patent No.: US 8,564,886 B2
(45) Date of Patent: Oct. 22, 2013

(54) ZOOM LENS

(75) Inventor: Yu-Min Chang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 21 days.

(21) Appl. No.: 13/433,863

(22) Filed: Mar. 29, 2012

(65) Prior Publication Data

US 2013/0003190 A1    Jan. 3, 2013

(30) Foreign Application Priority Data

Jul. 1, 2011  (TW) .................................. 100123380

(51) Int. Cl.
*G02B 15/14* (2006.01)
(52) U.S. Cl.
USPC ........................... 359/676; 359/687; 359/684
(58) Field of Classification Search
USPC ......... 359/676, 687, 684, 686, 681–682, 713, 359/714
See application file for complete search history.

(56) References Cited

U.S. PATENT DOCUMENTS 7,843,647 B2 * 11/2010 Sato ............................. 359/676

* cited by examiner

*Primary Examiner* — Alicia M Harrington
(74) *Attorney, Agent, or Firm* — Tracy M. Heims; Apex Juris, pllc

(57) ABSTRACT

A zoom lens includes a first lens group, a second lens group, an aperture, a third lens group, a fourth lens group, a fifth lens group, and an image surface in order along an optical axis from an object side to an image side. The first lens group has positive refractive power, and includes three lenses. The second lens group has negative refractive power, and includes fourth lenses. The third lens group has positive refractive power, and includes two lenses. The fourth lens group has positive refractive power, and includes five lenses. The fifth lens group has positive refractive power, and includes two lenses. Therefore, the zoom lens has a small size and high zoom ratio.

21 Claims, 30 Drawing Sheets

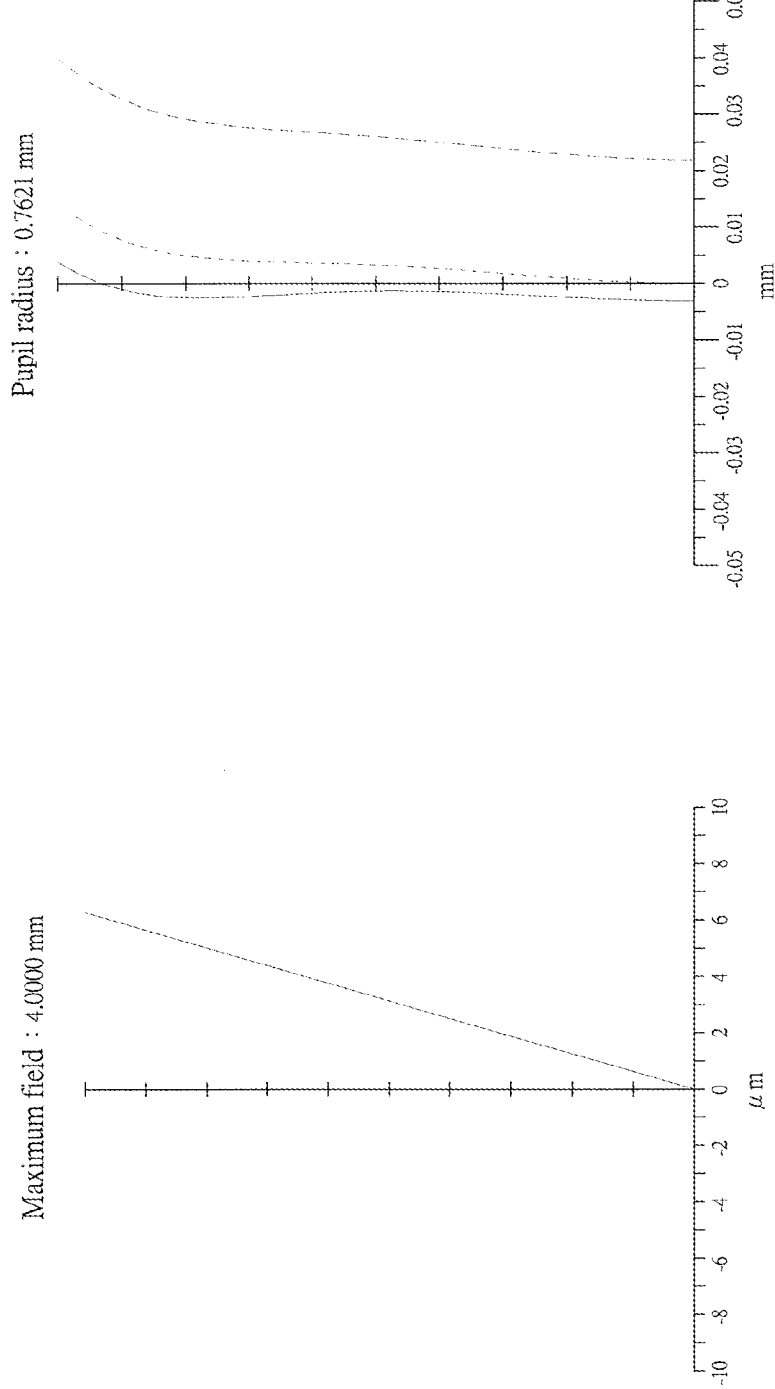

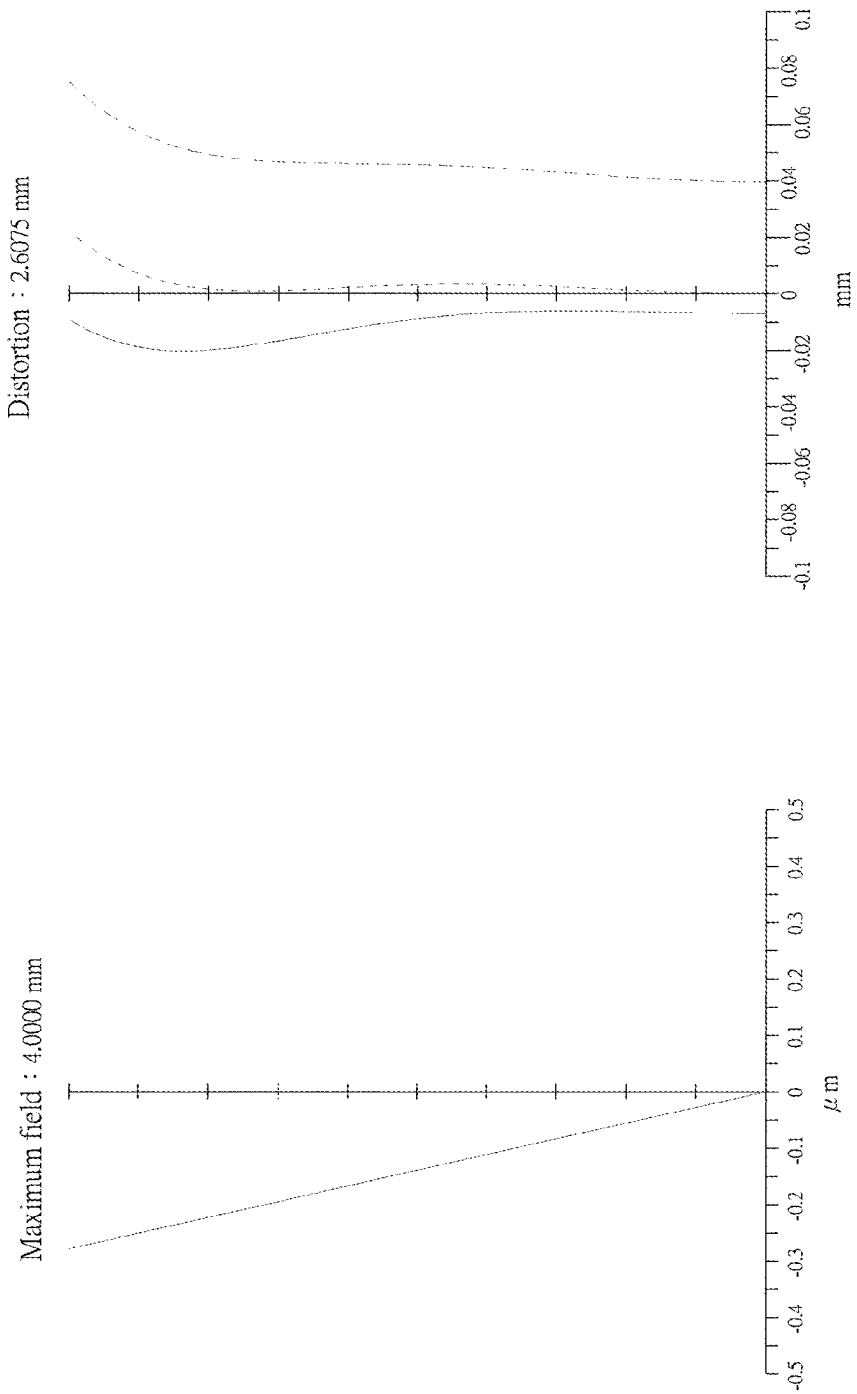

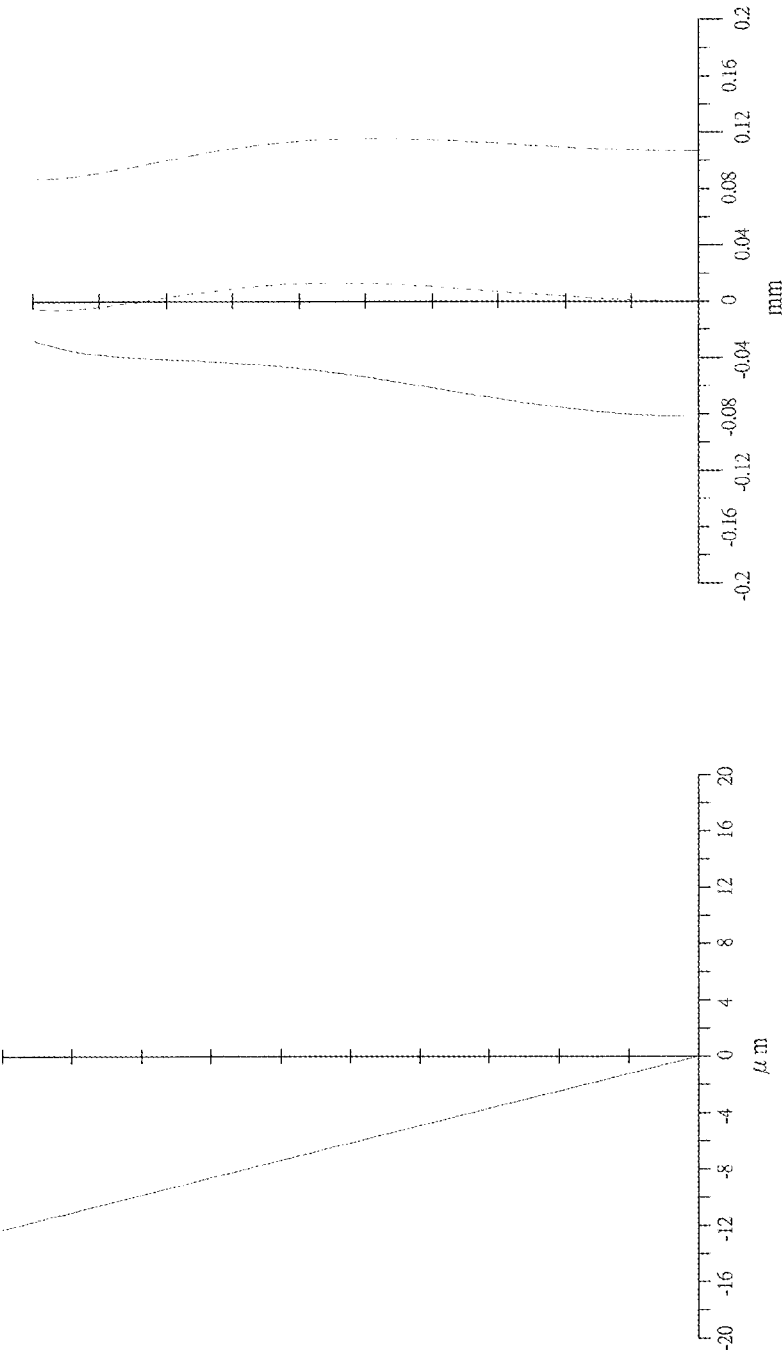

ZOOM LENS

BACKGROUND OF THE INVENTION

1. Field of the Invention

The present invention relates generally to a lens, and more particularly to a zoom lens.

2. Description of the Related Art

With advancement in technology, image devices, such as camera, video camera, microscope, and scanner, are made smaller and lighter for portability and operation that the zoom lenses incorporated in such image devices have to reduce its size. Except that, the zoom lenses must have high optical performance, such as high zoom ratio, high resolution, and high contrast. Therefore, small size and high optical performance are the important facts of the modern zoom lenses.

In order to raise the zoom ratio and the optical performance, more and more lens groups are provided in the zoom lens. As we know, some zoom lenses have twenty lens groups or more. It is obvious that more lens groups will cause the zoom lens bigger and heavier. However, when the zoom lens has fewer lens groups, it may have a small size, but the optical performance is poor.

SUMMARY OF THE INVENTION

The primary objective of the present invention is to provide a zoom lens, which has a small size, high zoom ratio, and high optical performance.

According to the objective of the present invention, the present invention provides a zoom lens including a first lens group, a second lens group, an aperture, a third lens group, a fourth lens group, a fifth lens group, and an image surface in order along an optical axis from an object side to an image side. The first lens group has positive refractive power, and includes three lenses, wherein two of the lenses have positive refractive power. The second lens group has negative refractive power, and includes fourth lenses. The third lens group has positive refractive power, and includes two lenses, wherein one of the lenses has positive refractive power. The fourth lens group has positive refractive power, and includes five lenses, wherein three of the lenses have positive refractive power. The fifth lens group has positive refractive power, and includes two lenses, wherein one of the lenses has positive refractive power.

The zoom lens may be switched to a telephoto mode from a wide-angle mode by moving the first lens group toward the object side, moving the second lens group toward the image side, moving the third lens group toward the object side, and moving the fourth lens group toward the object side that a distance between the first lens group and the second lens group increases, a distance between the second lens group and the third lens group decreases, and a distance between the third lens group and the fourth lens group decreases.

BRIEF DESCRIPTION OF THE DRAWINGS

FIG. 7B is a transverse chromatic aberration diagram of the second preferred embodiment of the present invention in the middle mode;

FIG. 7C is a spherical aberration diagram of the second preferred embodiment of the present invention in the middle mode;

FIG. 12B is a transverse chromatic aberration diagram of the third preferred embodiment of the present invention in the telephoto mode;

FIG. 12C is a spherical aberration diagram of the third preferred embodiment of the present invention in the telephoto mode.

DETAILED DESCRIPTION OF THE INVENTION

First Preferred Embodiment

Figure 1:
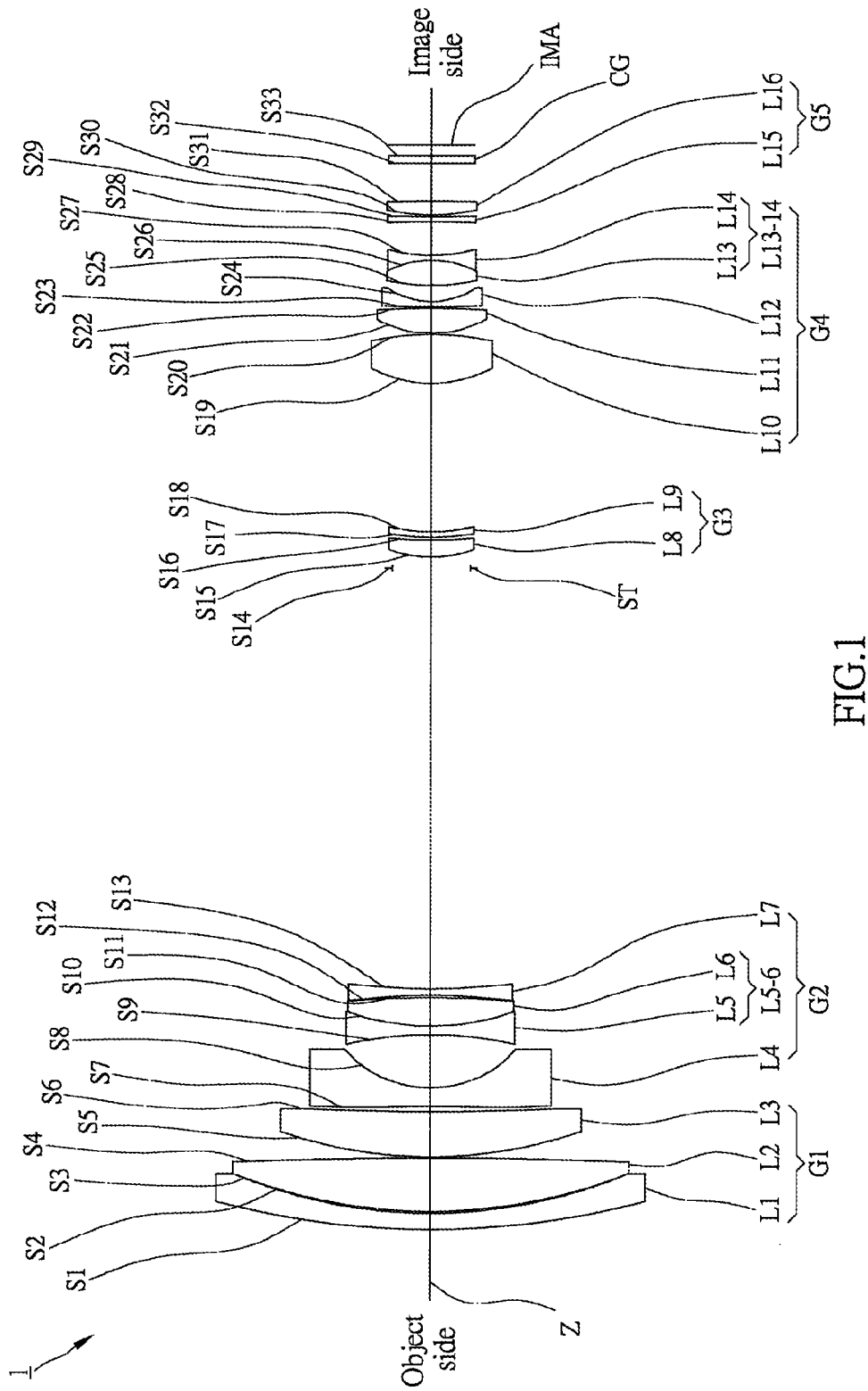
FIG. 1 is a sketch diagram of the arrangement of the lenses of a first preferred embodiment of the present invention.

As shown in FIG. 1, a zoom lens 1 of the first preferred embodiment of the present includes, along an optical axis Z from an object side to an image side, a first lens group G1, a second lens group G2, an aperture ST, a third lens group G3, a fourth lens group G4, a fifth lens group G5, and an image surface IMA. It may be further provided with a cover glass CG, which is a flat glass in the present embodiment, between the fifth lens group G5 and the image surface IMA.

The first lens group G1 has positive refractive power and includes a first lens L1, a second lens L2, and a third lens L3 in order from the object side to the image side. The first lens L1 is a meniscus lens with negative refractive power, and its convex surface S1 faces the object side. The second lens L2 is a biconvex lens with positive refractive power. The third lens L3 is a meniscus lens with positive refractive power, and its convex surface S5 faces the object side.

The second lens group G2 has negative refractive power, and includes a fourth lens L4, a fifth lens L5, a sixth lens L6, and a seventh lens L7 in order from the object side to the image side. The fourth lens L4 is a biconcave lens with negative refractive power, and both of its concave surfaces S7 and S8 are aspheric surfaces. The fifth lens L5 is a biconcave lens with negative refractive power. The sixth lens L6 is a biconvex lens with positive refractive power. The fifth and sixth lenses L5 and L6 are coupled together to form a compound lens L5-6. The seventh lens L7 is a biconcave lens with negative refractive power, and its concave surface S12 is an aspheric surface and faces the object side.

The third lens group G3 has positive refractive power and includes an eighth lens L8 and a ninth lens L9 in order from the object side to the image side. The eighth lens L8 is a meniscus lens with positive refractive power, and its convex surface S15 is an aspheric surface and faces the object side. The ninth lens L9 is a meniscus lens with negative refractive power, and its convex surface S17 faces the object side.

The fourth lens group G4 has positive refractive power and includes a tenth lens L10, an eleventh lens L11, a twelfth lens L12, a thirteenth lens L13, and a fourteenth lens L14 in order from the object side to the image side. The tenth lens L10 is a biconvex lens with positive refractive power, and both of its convex surfaces S18 and S19 are aspheric surfaces. The eleventh lens L11 is a biconvex lens with positive refractive power. The twelfth lens L12 is a meniscus lens with negative refractive power, and its convex surface S23 faces the object side. The thirteenth lens L13 is a biconvex lens with positive refractive power. The fourteenth lens L14 is a biconcave lens with negative refractive power. The thirteenth lens L13 and the fourteenth lens L14 are coupled together to form a compound lens S13-14.

The fifth lens group G5 has positive refractive power and includes a fifteenth lens L15 and a sixteenth lens L16 in order from the object side to the image side. The fifteenth lens L15 is a biconcave lens with negative refractive power. The sixteenth lens L16 is a biconvex lens with positive refractive power, and it has an aspheric surface S30 facing the object side.

The zoom lens 1 of the present invention may be switched to a wide-angle mode, a middle mode, and a telephoto mode by moving the first lens group G1, the second lens group G2, the third lens group G3, and the fourth lens group G4. The zoom lens 1 is switched to the telephoto mode from the wide-angle mode by moving the first lens group G1 toward the object side, moving the second lens group G2 toward the image side, moving the third lens group G3 toward the object side, and moving the fourth lens group G4 toward the object side that a distance between the first lens group G1 and the second lens group G2 increases, a distance between the second lens group G2 and the third lens group G3 decreases, and a distance between the third lens group G3 and the fourth lens group G4 decreases. In addition, the fifth lens group G5 is moved toward the object side when the zoom lens 1 of the present invention is focusing.

In order to obtain a good optical performance, the zoom lens 1 of the present invention has the following features:

$$fT/fW \geq 32 \qquad (1)$$

$$0.2 \leq (DG12 \cdot fW)/(fT \cdot Y) \leq 0.5 \qquad (2)$$

$$9 < |(MG2 \cdot Y)/fG2| \leq 13 \qquad (3)$$

$$0 < |M3T/M3W| \leq 0.7 \qquad (4)$$

$$0.75 < |M345T/M345W| \leq 6.0 \qquad (5)$$

wherein fT is the focus length of the zoom lens 1 in telephoto mode;

fW is the focus length of the zoom lens 1 in wide-angle mode;

DG12 is the difference of distance between the first lens group G1 and the second lens group G2 when the zoom lens 1 is switched to the telephoto mode from the wide-angle mode;

Y is a half of the maximum diagonal of the image surface IMA;

MG2 is the distance of movement of the second lens group G2 when the zoom lens 1 is switched to the telephoto mode from the wide-angle mode;

fG2 is the focus length of the second lens group G2;

M3T is the transverse zoom ratio of the third lens group G3 in the telephoto mode;

M3W is the transverse zoom ratio of the third lens group G3 in the wide-angle mode;

M345T is the sum of the transverse zoom ratios of the third lens group G3, the fourth lens group G4, and the fifth lens group G5 in the telephoto mode; and M345W is the sum of the transverse zoom ratios of the third lens group G3, the fourth lens group G4, and the fifth lens group G5 in the wide-angle mode.

The zoom lens 1 of the present invention will have the following specifications when it satisfies the above five features:

$$fT/fW = 33.99 \quad (1)$$

$$(DG12 \cdot fW)/(fT \cdot Y) = 0.37 \quad (2)$$

$$|(MG2 \cdot Y)/fG2| = 12.30 \quad (3)$$

$$|M3T/M3W| = 0.37 \quad (4)$$

$$|M345T/M345W| = 4.64 \quad (5)$$

The focus length (F), the half of the maximum diagonal of the image surface IMA (Y), the radius of curvature at the optical axis of each lens (R), the thickness at the optical axis of each lens (T), the refractive index (Nd), and the Abbe number (Vd) of the zoom lens 1 of the present invention is shown in Table 1.

TABLE 1

| | F = 4.42(W)~25.8(M)~150.2(T) Y = 4.00 mm | | | | |
|---|---|---|---|---|---|
| Surface | R (mm) | T (mm) | Nd | Vd | note |
| S1 | 77.640 | 1.500 | 1.90363 | 31.3 | L1 |
| S2 | 47.737 | 0.153 | | | |
| S3 | 49.611 | 4.956 | 1.49700 | 81.5 | L2 |
| S4 | −482.154 | 0.130 | | | |
| S5 | 43.105 | 4.207 | 1.49700 | 81.5 | L3 |
| S6 | 279.007 | 0.499739(W)~30.20574(M)~50.8056(T) | | | |
| S7 | −93.932 | 1.750 | 1.85981 | 40.6 | L4 |
| S8 | 11.689 | 4.898 | | | |
| S9 | −36.094 | 0.800 | 1.65160 | 58.6 | L5 |
| S10 | 23.343 | 2.628 | 1.92287 | 18.9 | L6 |
| S11 | −101.309 | 0.227 | | | |
| S12 | −47.580 | 0.600 | 1.53461 | 56.1 | L7 |
| S13 | 61.270 | 39.10972(W)~10.15994(M)~1.495307(T) | | | |
| S14 | | 1.00 | | | ST |
| S15 | 11.292 | 1.561 | 1.53461 | 56.1 | L8 |
| S16 | 44.816 | 0.274 | | | |
| S17 | 25.243 | 0.498 | 1.84667 | 23.8 | L9 |
| S18 | 16.898 | 13.75065(W)~5.978215(M)~0.593481(T) | | | |
| S19 | 11.069 | 4.564 | 1.53461 | 56.1 | L10 |
| S20 | −24.327 | 0.127 | | | |
| S21 | 10.751 | 2.313 | 1.48749 | 70.2 | L11 |
| S22 | −112.026 | 0.127 | | | |
| S23 | 94.088 | 0.499 | 1.84667 | 23.8 | L12 |
| S24 | 7.399 | 1.527 | | | |
| S25 | 21.970 | 2.305 | 1.67270 | 32.1 | L13 |
| S26 | −9.151 | 0.450 | 1.64000 | 60.1 | L14 |
| S27 | 15.686 | 3.094273(W)~8.630864(M)~27.33493(T) | | | |
| S28 | −85.999 | 0.500 | 1.84667 | 23.8 | L15 |
| S29 | 248.159 | 0.128 | | | |
| S30 | 18.469 | 1.330 | 1.53461 | 56.1 | L16 |
| S31 | −167.305 | 3.465365(W)~10.89754(M)~2.00292(T) | | | |
| S32 | INF | 0.72 | 1.51633 | 64.1 | CG |
| S33 | INF | 1.00 | | | |

In the column T of Table 1, W indicates the distance between two neighboring surfaces in the optical axis in the wide-angle mode;
M indicates the distance between two neighboring surfaces in the optical axis in the middle mode;
T indicates the distance between two neighboring surfaces in the optical axis in the telephoto mode.

The depression z of the aspheric surfaces S7, S8, S12, S15, S19, S20, and S30 may be obtained by the following equation:

$$z = \frac{ch^2}{1 + [1 - (k+1)c^2h^2]^{\frac{1}{2}}} + Ah^4 + Bh^6 + Ch^8 + Dh^{10} + Eh^{12}$$

wherein z is the depression of the aspheric surface;

c is the reciprocal of radius of curvature;

h is the radius of aperture on the surface;

k is conic constant;

AE are coefficients of the radius of aperture h.

The conic constants of the aspheric surfaces and the coefficients AE are shown in Table 2.

TABLE 2

|  | K | A | B | C | D | E |
|---|---|---|---|---|---|---|
| S7 | −2.84813E+01 | 9.04641E−05 | −8.34177E−07 | 8.54234E−09 | −5.73042E−11 | 1.38519E−13 |
| S8 | −4.74469E+00 | 4.36089E−04 | −3.56942E−06 | 1.35229E−08 | 1.28302E−09 | 1.34886E−11 |
| S12 | 0 | −6.79483E−06 | −8.59401E−08 | 3.07276E−08 | −2.77286E−10 | 0 |
| S15 | 0 | −4.85733E−05 | −6.54636E−07 | −6.55761E−10 | 0 | 0 |
| S19 | 0 | −1.56092E−04 | 6.37476E−07 | −2.28880E−08 | −1.71641E−10 | 0 |
| S20 | 0 | 5.71138E−05 | 1.20467E−06 | −4.63272E−08 | 1.63168E−10 | 0 |
| S30 | 0 | −1.54450E−05 | 1.10101E−06 | −2.13624E−08 | 0 | 0 |

The lenses and the apertures ST as described above may reduce the size of the zoom lens 1 of the present invention. The zoom lens 1 still has a good optical performance in the wide-angle mode as shown in FIG. 2A to FIG. 2D.

Figure 2A:
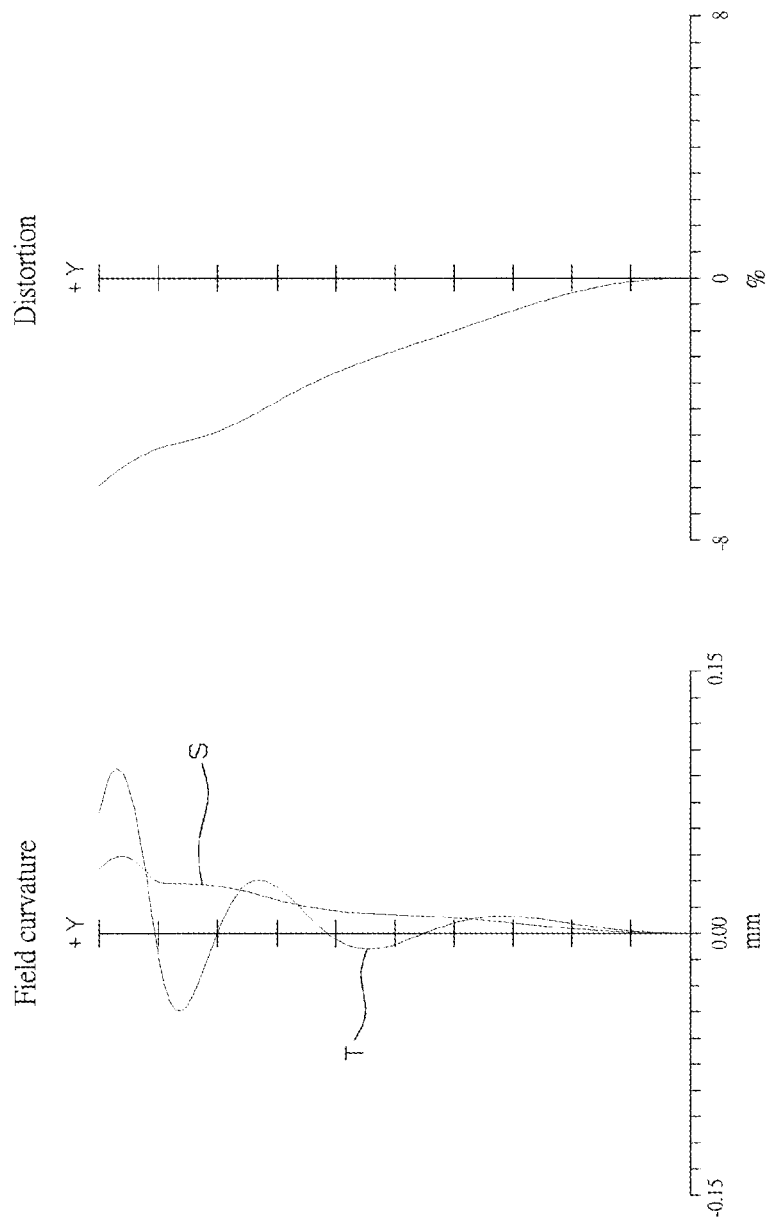
FIG. 2A is a field curvature diagram and a distortion diagram of the first preferred embodiment of the present invention in the wide-angle mode.
Figure 2:
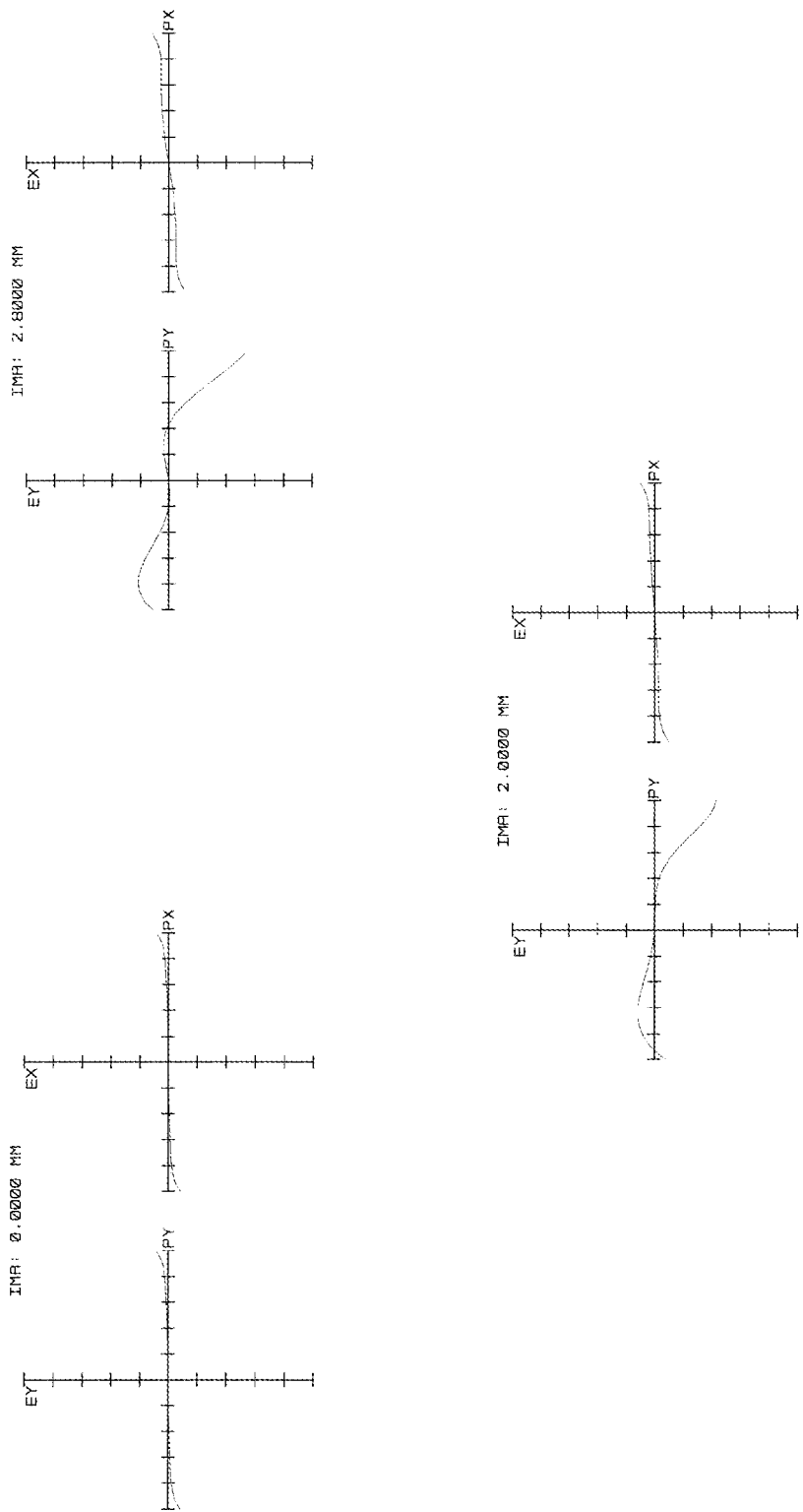
FIG. 2B is a transverse chromatic aberration diagram of the first preferred embodiment of the present invention in the wide-angle mode.
FIG. 2C is a spherical aberration diagram of the first preferred embodiment of the present invention in the wide-angle mode.
FIG. 2D is a coma aberration diagram of the first preferred embodiment of the present invention in the wide-angle mode.

In FIG. 2A, it shows that the maximum field curvature is about 0.0105 mm and −0.045 mm, and the maximum distortion is about −6.4%. In FIG. 2B, it shows that the maximum transverse chromatic aberration is about 7 μm. FIG. 2C shows that the maximum spherical aberration is about 0.04 mm and −0.005 mm. FIG. 2D shows that all the coma aberrations of the zoom lens 1 are acceptable.

Figure 3:
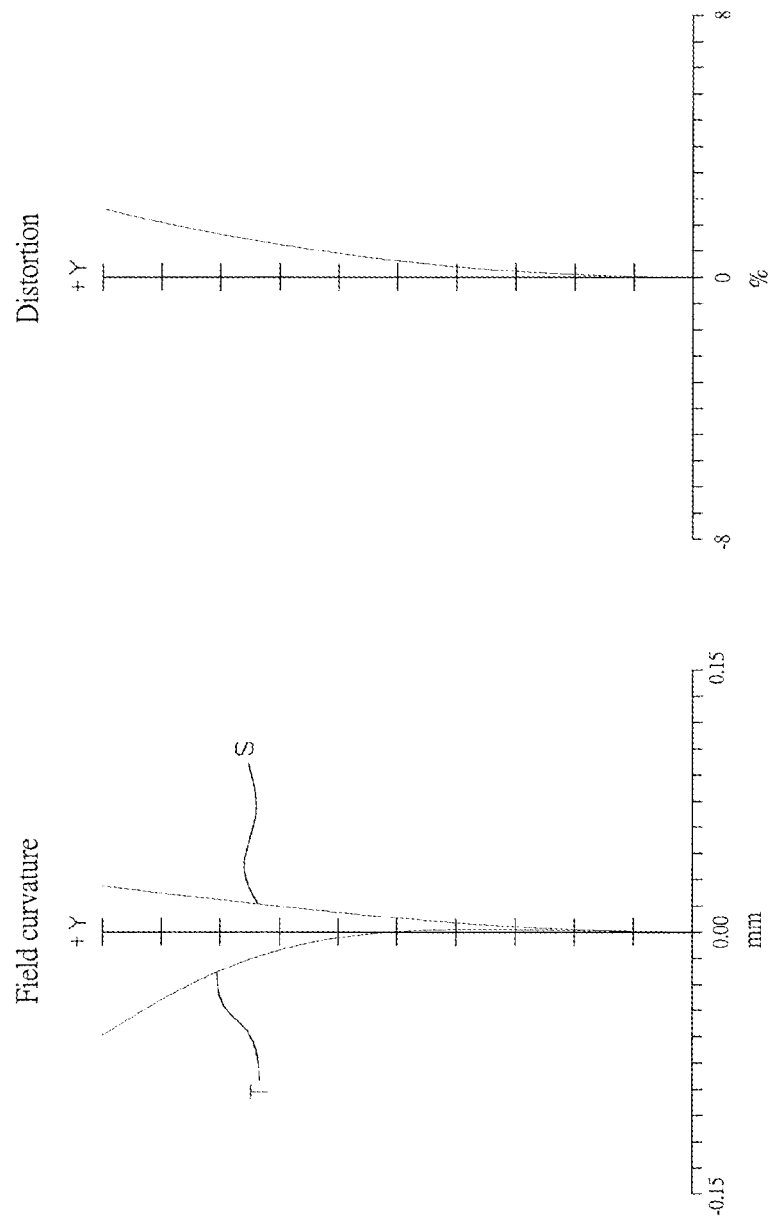
FIG. 3A is a field curvature diagram and a distortion diagram of the first preferred embodiment of the present invention in the middle mode.
FIG. 3B is a transverse chromatic aberration diagram of the first preferred embodiment of the present invention in the middle mode.
FIG. 3C is a spherical aberration diagram of the first preferred embodiment of the present invention in the middle mode.
FIG. 3D is a coma aberration diagram of the first preferred embodiment of the present invention in the middle mode.
Figures 3B, 3C:
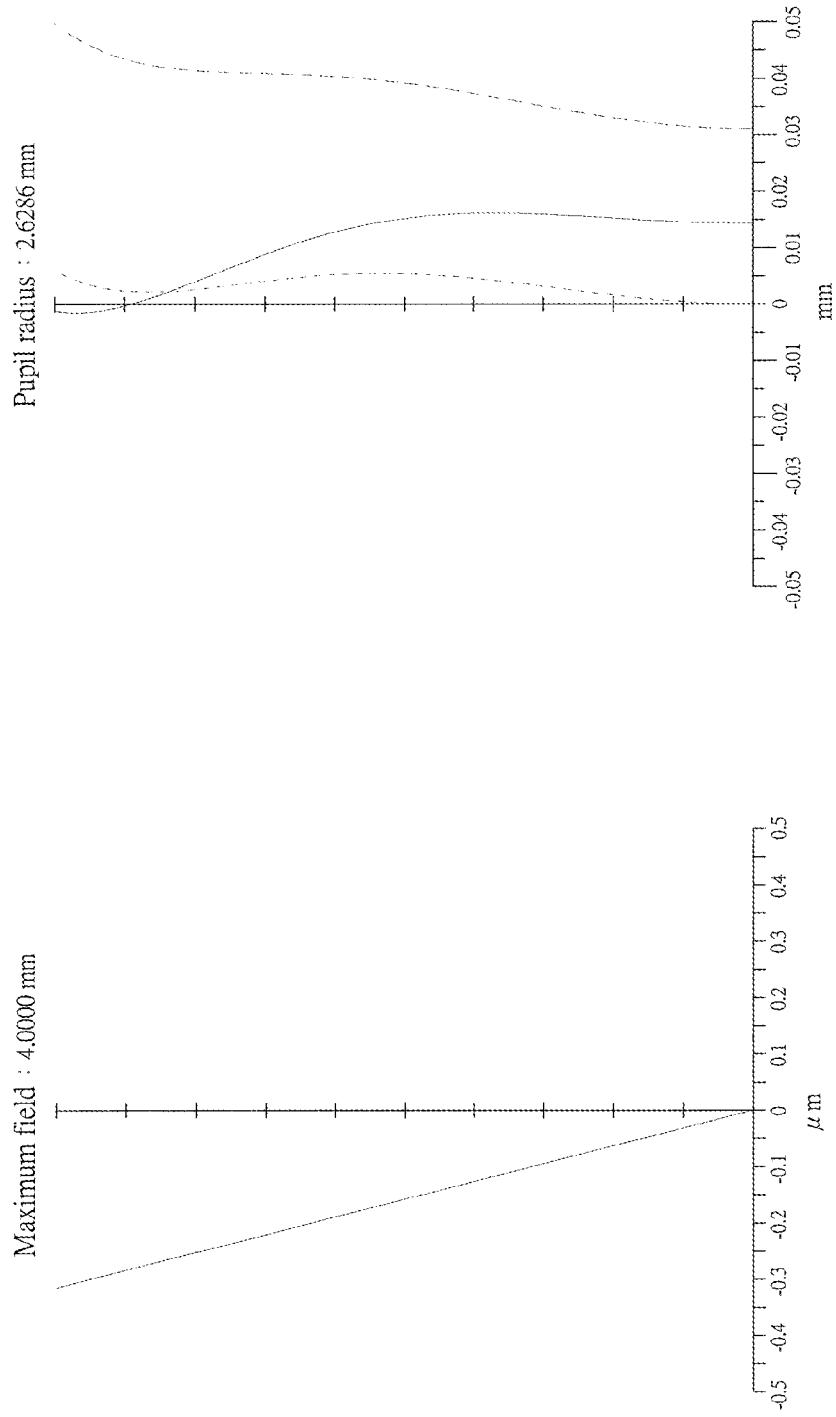
Figure 3:
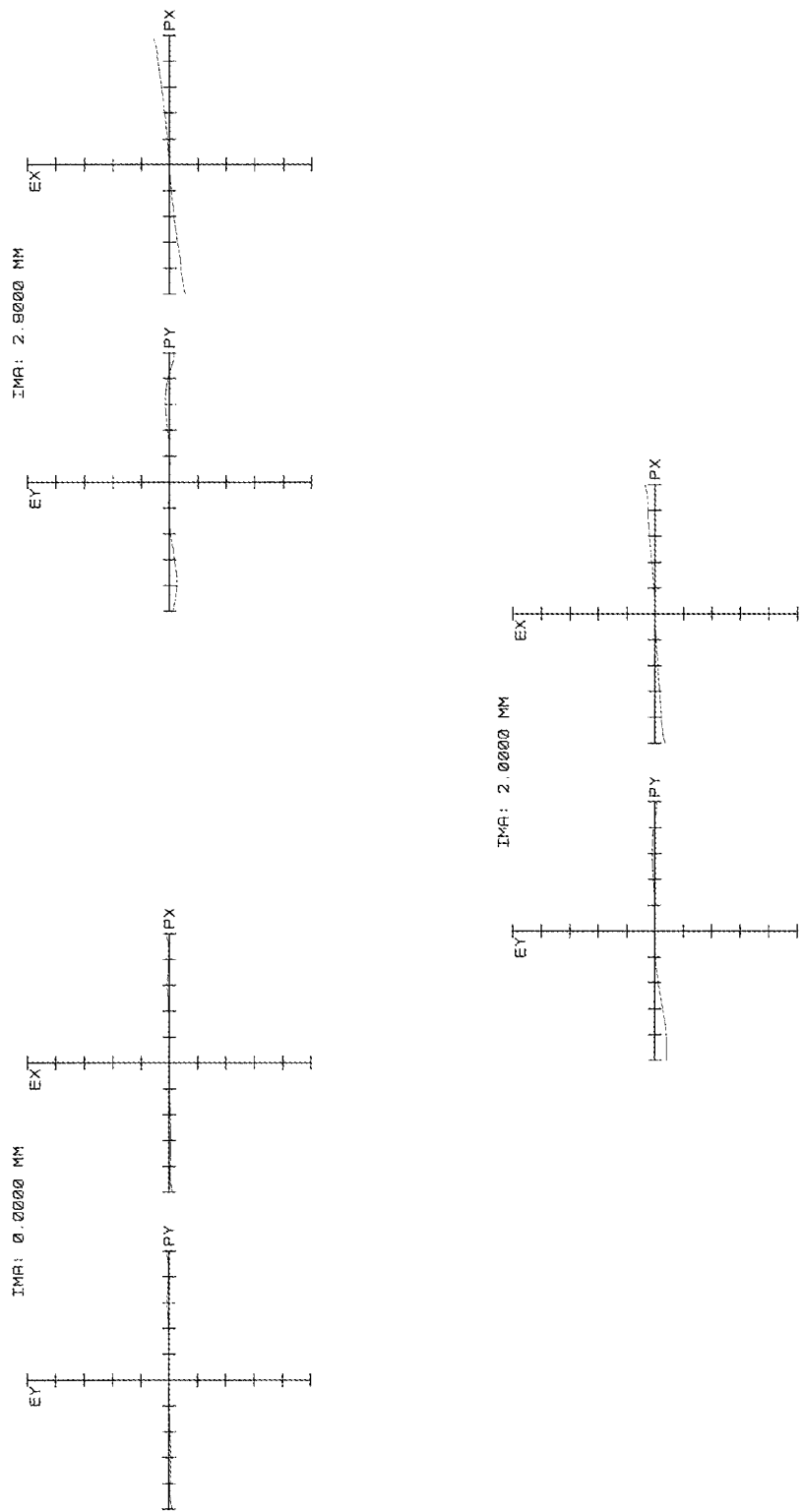

In the middle mode, the zoom lens 1 of the present invention has a good optical performance also. FIG. 3A shows the maximum field curvature is about 0.003 mm and −0.006 mm, and the maximum distortion is about 2.4%. In FIG. 3B, it shows that the maximum transverse chromatic aberration is about −0.35 μm. FIG. 3C shows that the maximum spherical aberration is about 0.05 mm and −0.005 mm. FIG. 3D shows that all the coma aberrations of the zoom lens 1 are acceptable.

Figure 4A:
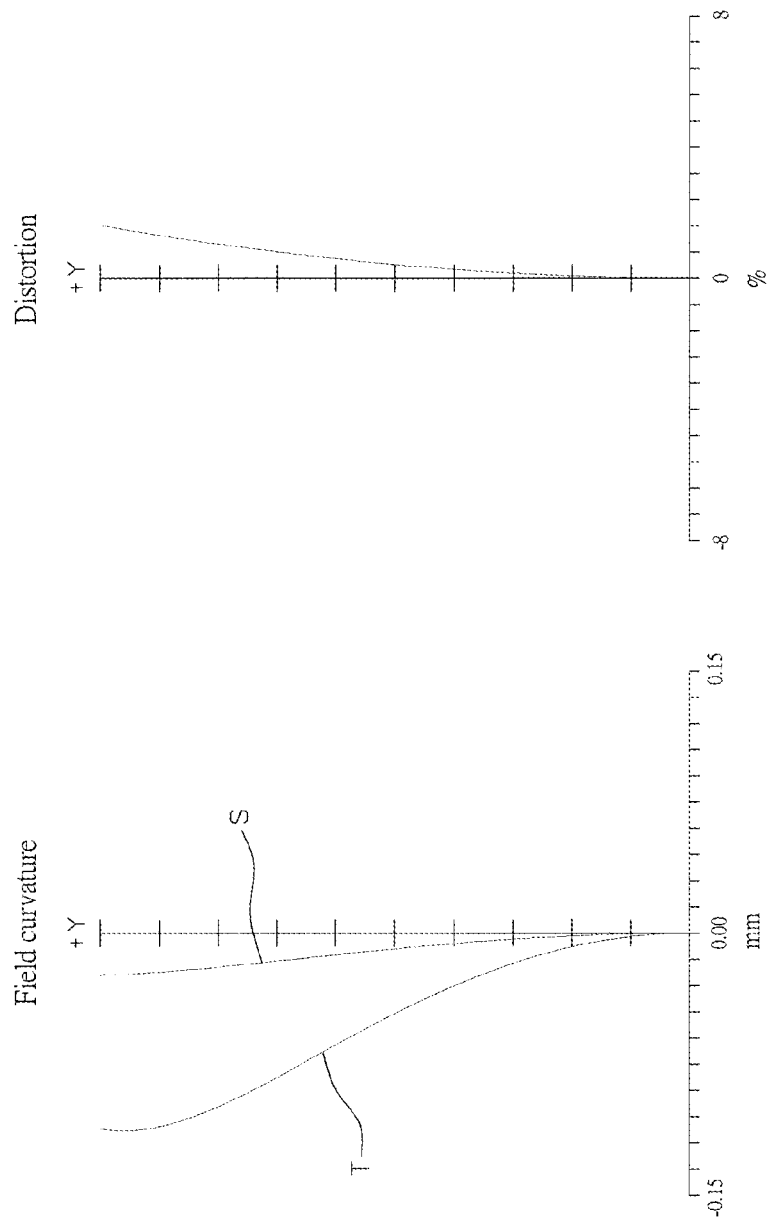
FIG. 4A is a field curvature diagram and a distortion diagram of the first preferred embodiment of the present invention in the telephoto mode.
Figures 4B, 4C:
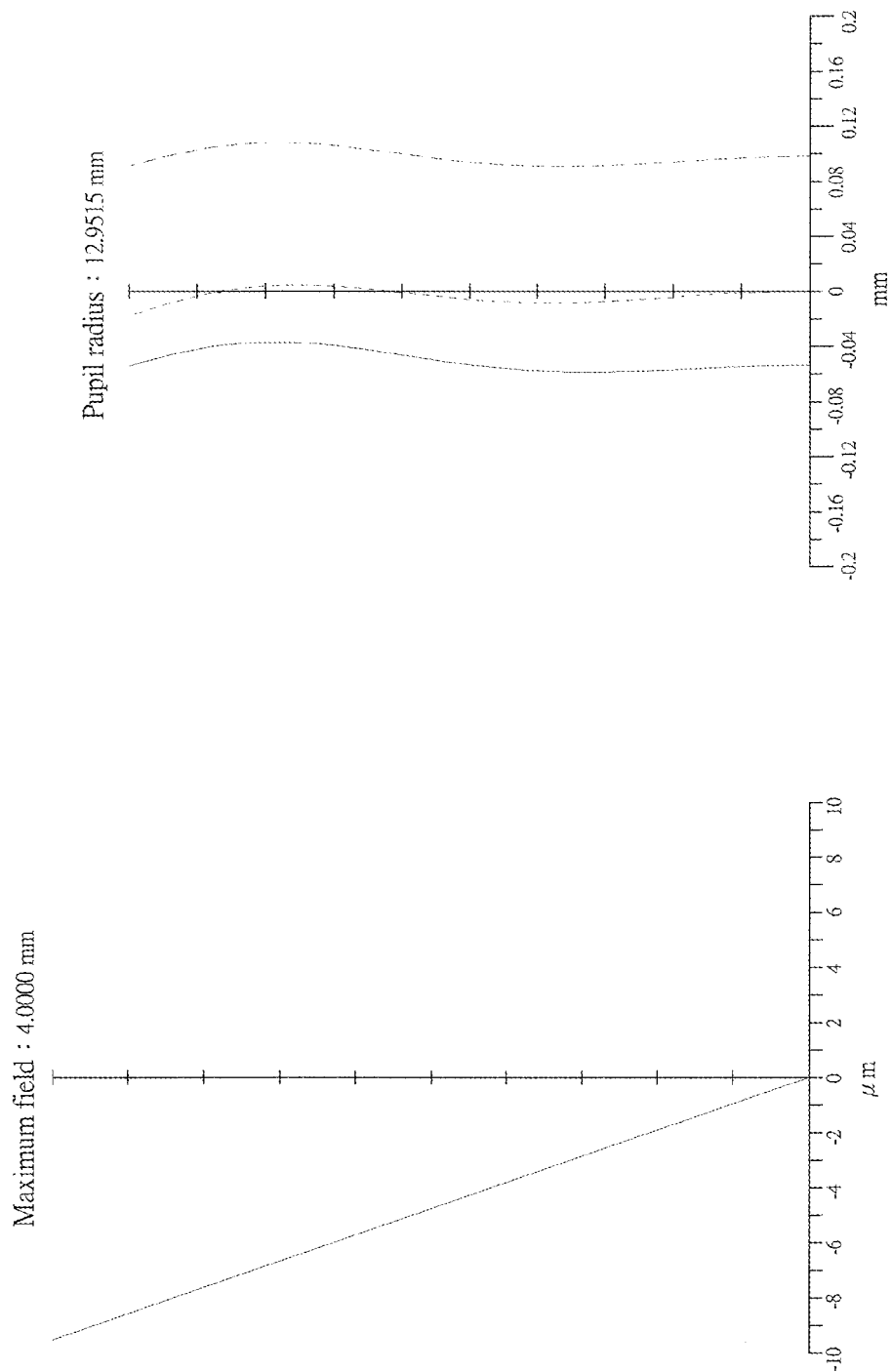
FIG. 4B is a transverse chromatic aberration diagram of the first preferred embodiment of the present invention in the telephoto mode.
FIG. 4C is a spherical aberration diagram of the first preferred embodiment of the present invention in the telephoto mode.
Figure 4:
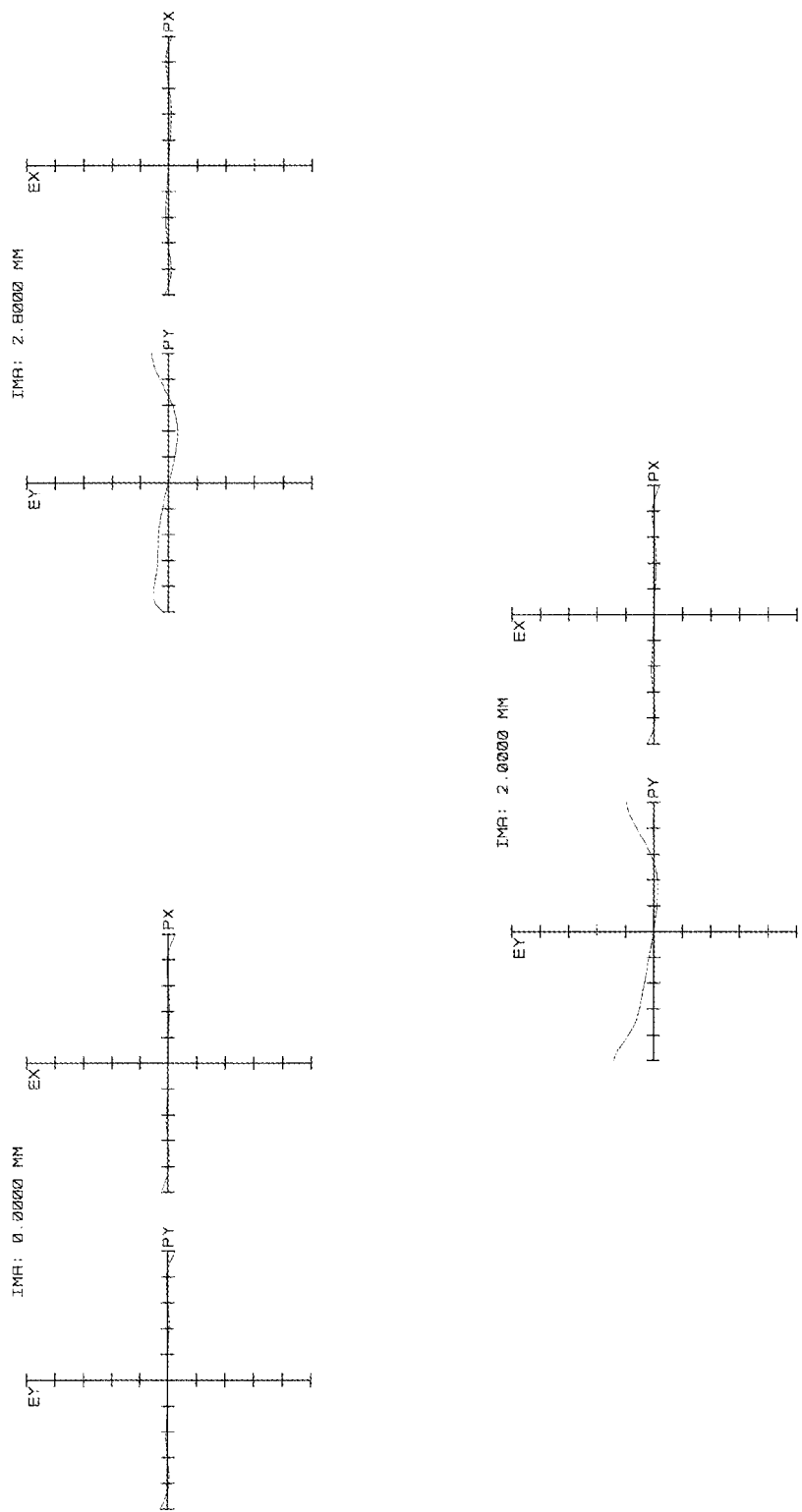
FIG. 4D is a coma aberration diagram of the first preferred embodiment of the present invention in the telephoto mode.

In the telephoto mode, FIG. 4A shows the maximum field curvature is about 0.015 mm and −0.12 mm, and the maximum distortion is about 1.6%. In FIG. 4B, it shows that the maximum transverse chromatic aberration is about −10 μm. FIG. 4C shows that the maximum spherical aberration is about 0.12 mm and −0.06 mm. FIG. 4D shows that all the coma aberrations of the zoom lens 1 are acceptable.

Second Preferred Embodiment

Figure 5:
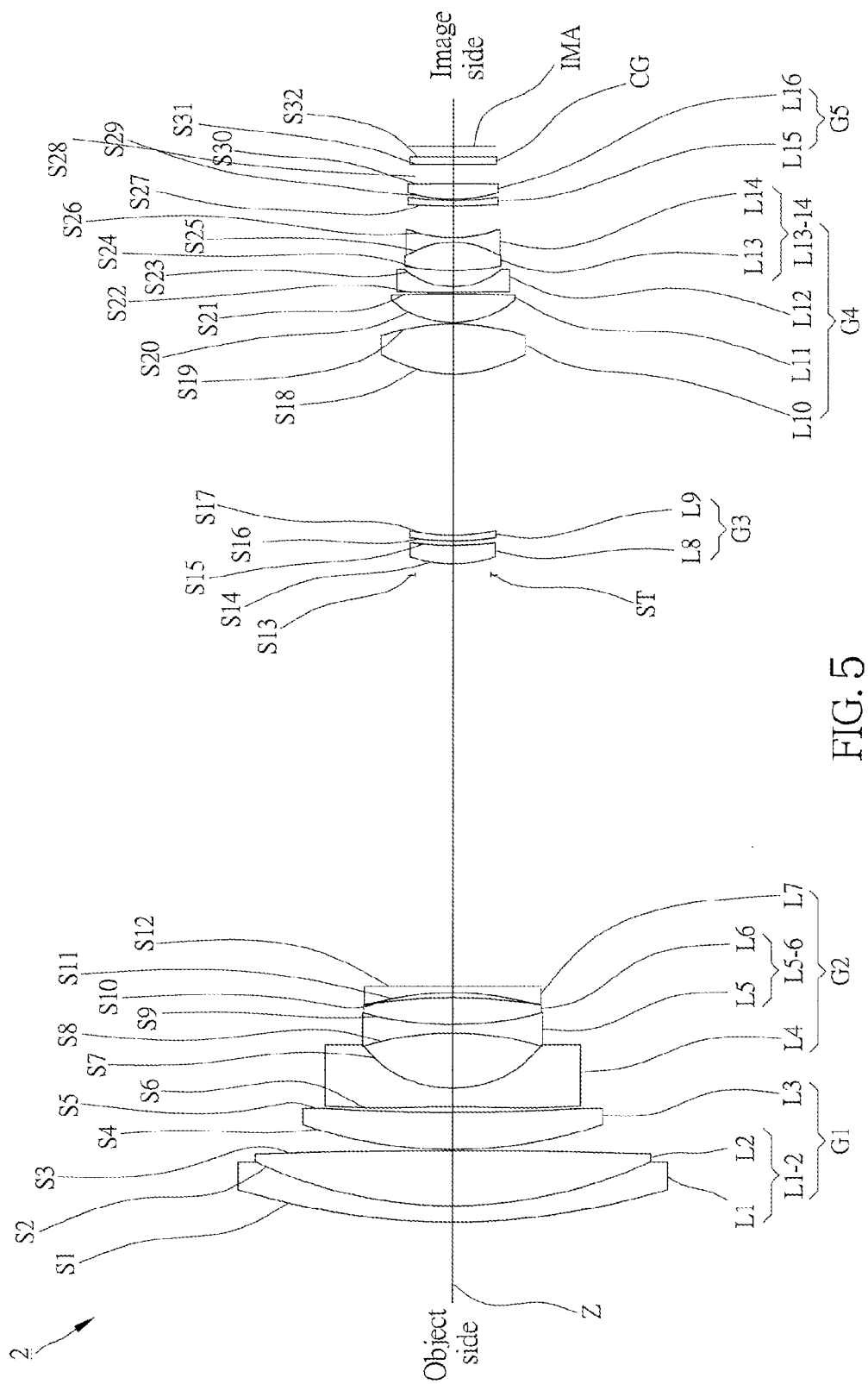
FIG. 5 is a sketch diagram of the arrangement of the lenses of a second preferred embodiment of the present invention.

FIG. 5 shows a zoom lens 2 of the second preferred embodiment of the present invention which includes, along an optical axis Z from an object side to an image side, a first lens group G1, a second lens group G2, an aperture ST, a third lens group G3, a fourth lens group G4, a fifth lens group G5, and an image surface IMA. It may be further provided with a cover glass CG.

The first lens group G1 has positive refractive power and includes a first lens L1, a second lens L2, and a third lens L3 in order from the object side to the image side. The first lens L1 is a meniscus lens with negative refractive power, and its convex surface S1 faces the object side. The second lens L2 is a biconvex lens with positive refractive power. The first and second lenses L1 and L2 are coupled together to form a compound lens L1-2. The third lens L3 is a meniscus lens with positive refractive power, and its convex surface S4 facing the object side.

The second lens group G2 has negative refractive power, and includes a fourth lens L4, a fifth lens L5, a sixth lens L6, and a seventh lens L7 in order from the object side to the image side. The fourth lens L4 is a biconcave lens with negative refractive power, and both of its concave surfaces S6 and S7 are aspheric surfaces. The fifth lens L5 is a biconcave lens with negative refractive power. The sixth lens L6 is a biconvex lens with positive refractive power. The fifth and sixth lenses L5 and L6 are coupled together to form a compound lens L5-6. The seventh lens L7 is a biconcave lens with negative refractive power, and its concave surface S11 is an aspheric surface and faces the object side.

The third lens group G3 has positive refractive power, and includes an eighth lens L8 and a ninth lens L9 in order from the object side to the image side. The eighth lens L8 is a meniscus lens with positive refractive power, and its convex surface S14 is an aspheric surface and faces the object side. The ninth lens L9 is a meniscus lens with negative refractive power, and its convex surface S16 faces the object side.

The fourth lens group G4 has positive refractive power and includes a tenth lens L10, an eleventh lens L11, a twelfth lens L12, a thirteenth lens L13, and a fourteenth lens L14 in order from the object side to the image side. The tenth lens L10 is a biconvex lens with positive refractive power, and both of its convex surfaces S18 and S19 are aspheric surfaces. The eleventh lens L11 is a biconvex lens with positive refractive power. The twelfth lens L12 is a meniscus lens with negative refractive power, and its convex surface S22 faces the object side. The thirteenth lens L13 is a biconvex lens with positive refractive power. The fourteenth lens L14 is a biconcave lens with negative refractive power. The thirteenth lens L13 and the fourteenth lens L14 are coupled together to form a compound lens S13-14.

The fifth lens group G5 has positive refractive power and includes a fifteenth lens L15 and a sixteenth lens L16 in order from the object side to the image side. The fifteenth lens L15 is a meniscus lens with negative refractive power, and its convex surface S27 faces the object side. The sixteenth lens L16 is a biconvex lens with positive refractive power, and it has an aspheric surface S29 facing the object side.

The zoom lens 2 of the present invention may be switched to a wide-angle mode, a middle mode, and a telephoto mode by moving the first lens group G1, the second lens group G2, the third lens group G3, and the fourth lens group G4. The zoom lens 2 is switched to the telephoto mode from the wide-angle mode by moving the first lens group G1 toward the object side, moving the second lens group G2 toward the image side, moving the third lens group G3 toward the object side, and moving the fourth lens group G4 toward the object side that a distance between the first lens group G1 and the second lens group G2 increases, a distance between the second lens group G2 and the third lens group G3 decreases, and a distance between the third lens group G3 and the fourth lens group G4 decreases. In addition, the fifth lens group G5 is moved toward the object side when the zoom lens 2 of the present invention is focusing.

In order to obtain a good optical performance, the zoom lens 2 of the present invention has the following features:

$$fT/fW \geq 32 \quad (1)$$

$$0.2 \leq (DG12 \cdot fW)/(fT \cdot Y) \leq 0.5 \quad (2)$$

$$9 < |(MG2 \cdot Y)/fG2| \leq 13 \quad (3)$$

$$0 < |M3T/M3W| \leq 0.7 \tag{4}$$

$$0.75 < |M345T/M345W| \leq 6.0 \tag{5}$$

wherein fT is the focus length of the zoom lens 1 in telephoto mode;

fW is the focus length of the zoom lens 1 in wide-angle mode;

DG12 is the difference of distance between the first lens group G1 and the second lens group G2 when the zoom lens 1 is switched to the telephoto mode from the wide-angle mode;

Y is a half of the maximum diagonal of the image surface IMA;

MG2 is the distance of movement of the second lens group G2 when the zoom lens 1 is switched to the telephoto mode from the wide-angle mode;

fG2 is the focus length of the second lens group G2;

M3T is the transverse zoom ratio of the third lens group G3 in the telephoto mode;

M3W is the transverse zoom ratio of the third lens group G3 in the wide-angle mode;

M345T is the sum of the transverse zoom ratios of the third lens group G3, the fourth lens group G4, and the fifth lens group G5 in the telephoto mode; and M345W is the sum of the transverse zoom ratios of the third lens group G3, the fourth lens group G4, and the fifth lens group G5 in the wide-angle mode.

The zoom lens 2 of the present invention will have the following specifications when it satisfies the above five features:

$$fT/fW = 33.97 \tag{1}$$

$$(DG12 \cdot fW)/(fT \cdot Y) = 0.35 \tag{2}$$

$$|(MG2 \cdot Y)/fG2| = 10.84 \tag{3}$$

$$|M3T/M3W| = 0.26 \tag{4}$$

$$|M345T/M345W| = 5.64 \tag{5}$$

The focus length (F), the a half of the maximum diagonal of the image surface IMA (Y), the radius of curvature at the optical axis of each lens (R), the thickness at the optical axis of each lens (T), the refractive index (Nd), and the Abbe number (Vd) of the zoom lens 2 of the present invention is shown in Table 3.

TABLE 3

F = 4.39(W)~25.6(M)~149.1(T)
Y = 4.15 mm

| Surface | R (mm) | T (mm) | Nd | Vd | note |
|---|---|---|---|---|---|
| S1 | 68.707 | 1.500 | 1.903627 | 31.3 | L1 |
| S2 | 43.879 | 5.144 | 1.497 | 81.5 | L2 |
| S3 | −597.403 | 0.130 | | | |
| S4 | 44.258 | 3.495 | 1.497 | 81.5 | L3 |
| S5 | 223.771 | 0.49256(W)~29.03564(M)~48.19356(T) | | | |
| S6 | −86.630 | 1.750 | 1.859814 | 40.6 | L4 |
| S7 | 11.820 | 5.143 | | | |
| S8 | −29.023 | 0.800 | 1.651599 | 58.6 | L5 |
| S9 | 33.780 | 2.507 | 1.922869 | 18.9 | L6 |
| S10 | −50.348 | 0.472 | | | |
| S11 | −27.136 | 0.600 | 1.534613 | 56.1 | L7 |
| S12 | 1805.271 | 38.47958(W)~9.039578(M)~0.999757(T) | | | |
| S13 | | 1.00 | | | ST |
| S14 | 11.458 | 1.765 | 1.534613 | 56.1 | L8 |
| S15 | 38.647 | 0.415 | | | |
| S16 | 28.872 | 0.495 | 1.846667 | 23.8 | L9 |
| S17 | 19.269 | 15.05702(W)~6.31694(M)~0.586284(T) | | | |
| S18 | 11.760 | 4.711 | 1.534613 | 56.1 | L10 |
| S19 | −19.204 | 0.124 | | | |
| S20 | 9.228 | 2.710 | 1.487491 | 70.2 | L11 |
| S21 | −120.276 | 0.123 | | | |
| S22 | 183.119 | 0.498 | 1.846667 | 23.8 | L12 |
| S23 | 7.145 | 1.541 | | | |
| S24 | 25.002 | 2.628 | 1.672704 | 32.1 | L13 |
| S25 | −8.308 | 0.450 | 1.640001 | 60.1 | L14 |
| S26 | 12.276 | 2.965759 (W)~6.746371(M)~29.46549(T) | | | |
| S27 | 59.707 | 0.500 | 1.846667 | 23.8 | L15 |
| S28 | 30.499 | 0.127 | | | |
| S29 | 15.967 | 1.414 | 1.534613 | 56.1 | L16 |
| S30 | −404.276 | 1.851727(W)~10.10681(M)~1.998342(T) | | | |
| S31 | INF | 0.72 | 1.516332 | 64.1 | CG |
| S32 | INF | 1.00 | | | |

In the column T of Table 3, W indicates the distance between two neighboring surfaces in the optical axis in the wide-angle mode;
M indicates the distance between two neighboring surfaces in the optical axis in the middle mode;
T indicates the distance between two neighboring surfaces in the optical axis in the telephoto mode.

The depression z of the aspheric surfaces S6, S7, S11, S14, S18, S19, and S29 may be obtained by the following equation:

$$z = \frac{ch^2}{1 + [1 - (k+1)c^2h^2]^{\frac{1}{2}}} + Ah^4 + Bh^6 + Ch^8 + Dh^{10} + Eh^{12}$$

wherein z is the depression of the aspheric surface;

c is the reciprocal of radius of curvature;

h is the radius of aperture on the surface;
k is conic constant;
AE are coefficients of the radius of aperture h.

The conic constants of the aspheric surfaces and the coefficients AE are shown in Table 4.

TABLE 4

| | K | A | B | C | D | E |
|---|---|---|---|---|---|---|
| S6 | −1.36649E+01 | 9.21960E−05 | −7.65819E−07 | 7.88272E−09 | −5.36981E−11 | 1.29538E−13 |
| S7 | −5.34600E+00 | 4.36089E−04 | −3.15353E−06 | −2.00494E−08 | 2.07297E−09 | −1.89998E−11 |
| S11 | 0 | −3.51823E−05 | 7.51662E−07 | 2.08831E−08 | −2.48013E−10 | 0 |
| S14 | 0 | −4.51349E−05 | −1.18161E−06 | 7.37744E−09 | 0 | 0 |
| S18 | 0 | −1.53347E−04 | 1.13037E−06 | −3.59884E−08 | 8.44884E−11 | 0 |
| S19 | 0 | 7.44652E−05 | 1.13490E−06 | −4.28670E−08 | 2.30078E−10 | 0 |
| S29 | 0 | −7.95028E−06 | 6.76828E−07 | −1.37333E−08 | 0 | 0 |

The lenses and the apertures ST as described above may reduce the size of the zoom lens 2 of the present invention. The zoom lens 2 still has a good optical performance in the wide-angle mode as shown in FIG. 6A to FIG. 6D.

Figure 6:
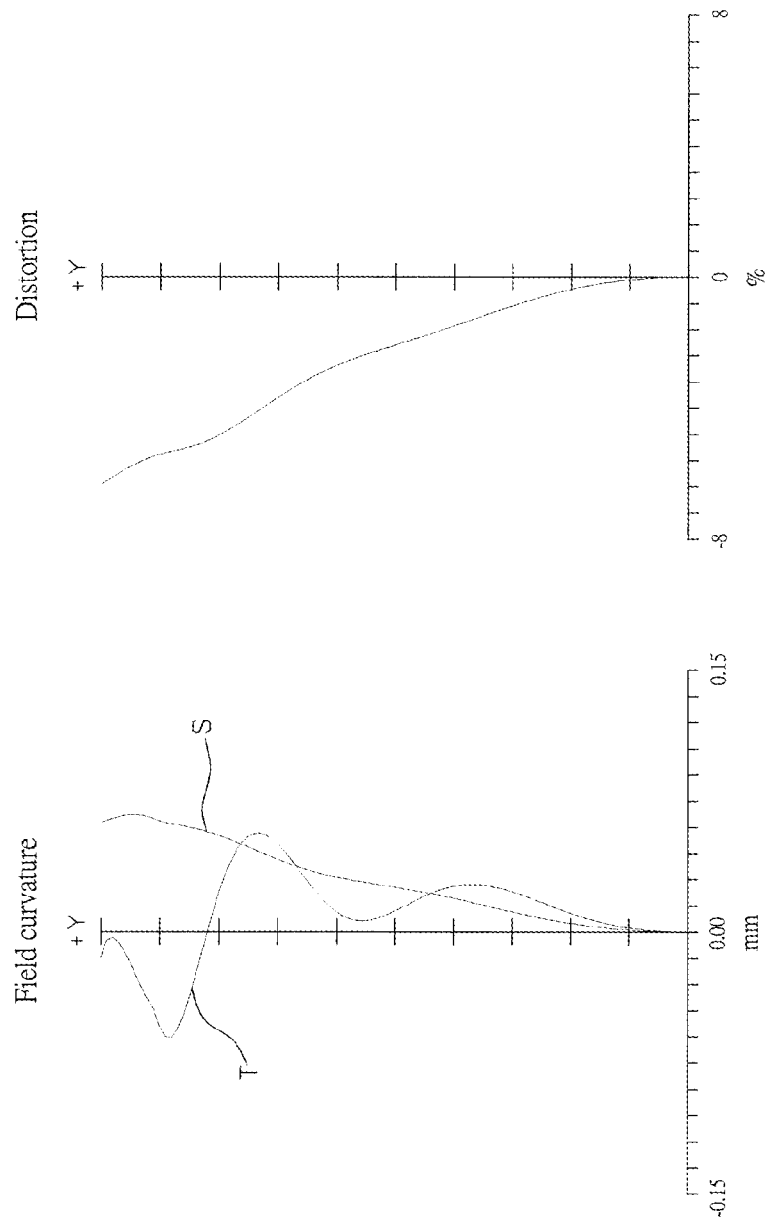
FIG. 6A is a field curvature diagram and a distortion diagram of the second preferred embodiment of the present invention in the wide-angle mode.
FIG. 6B is a transverse chromatic aberration diagram of the second preferred embodiment of the present invention in the wide-angle mode.
FIG. 6C is a spherical aberration diagram of the second preferred embodiment of the present invention in the wide-angle mode.
FIG. 6D is a coma aberration diagram of the second preferred embodiment of the present invention in the wide-angle mode.
Figures 6B, 6C:
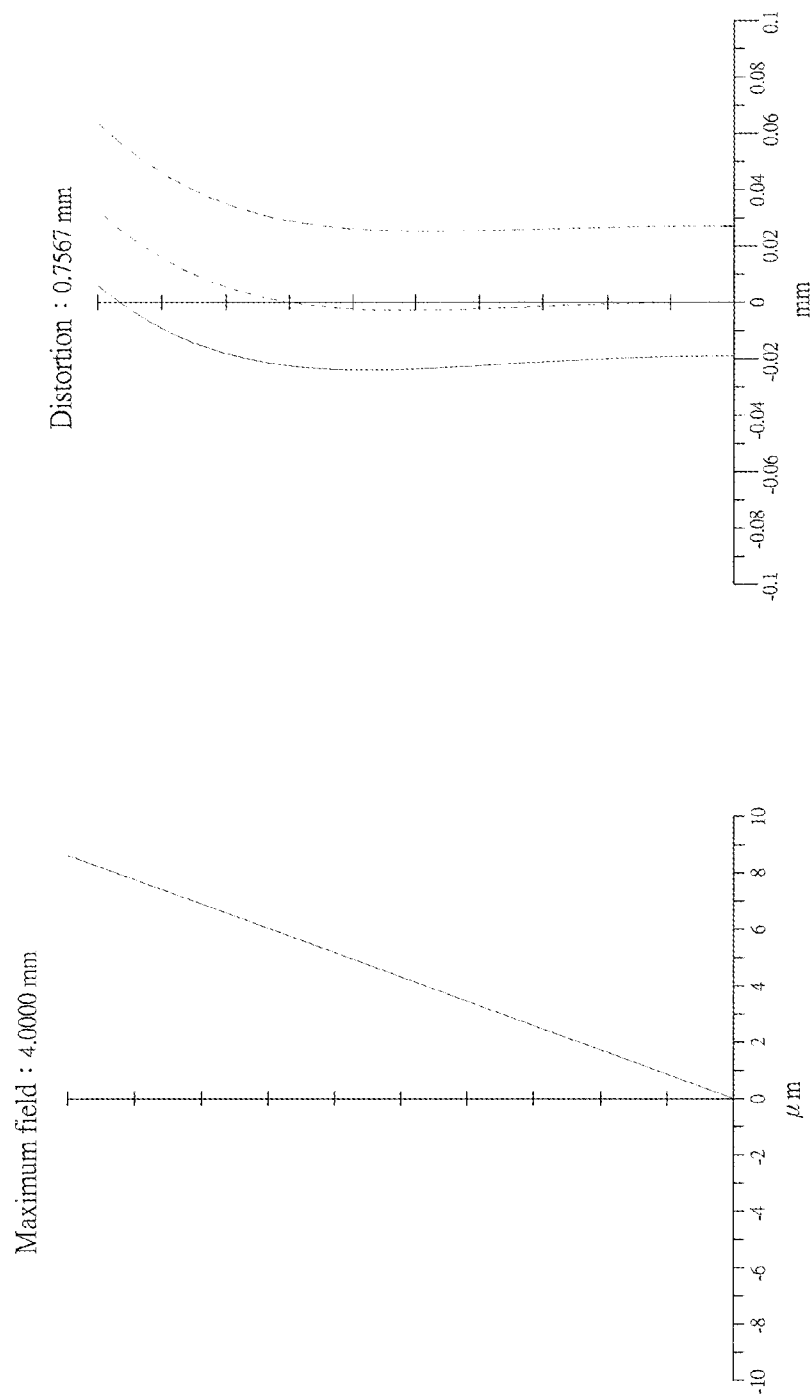
Figure 6:
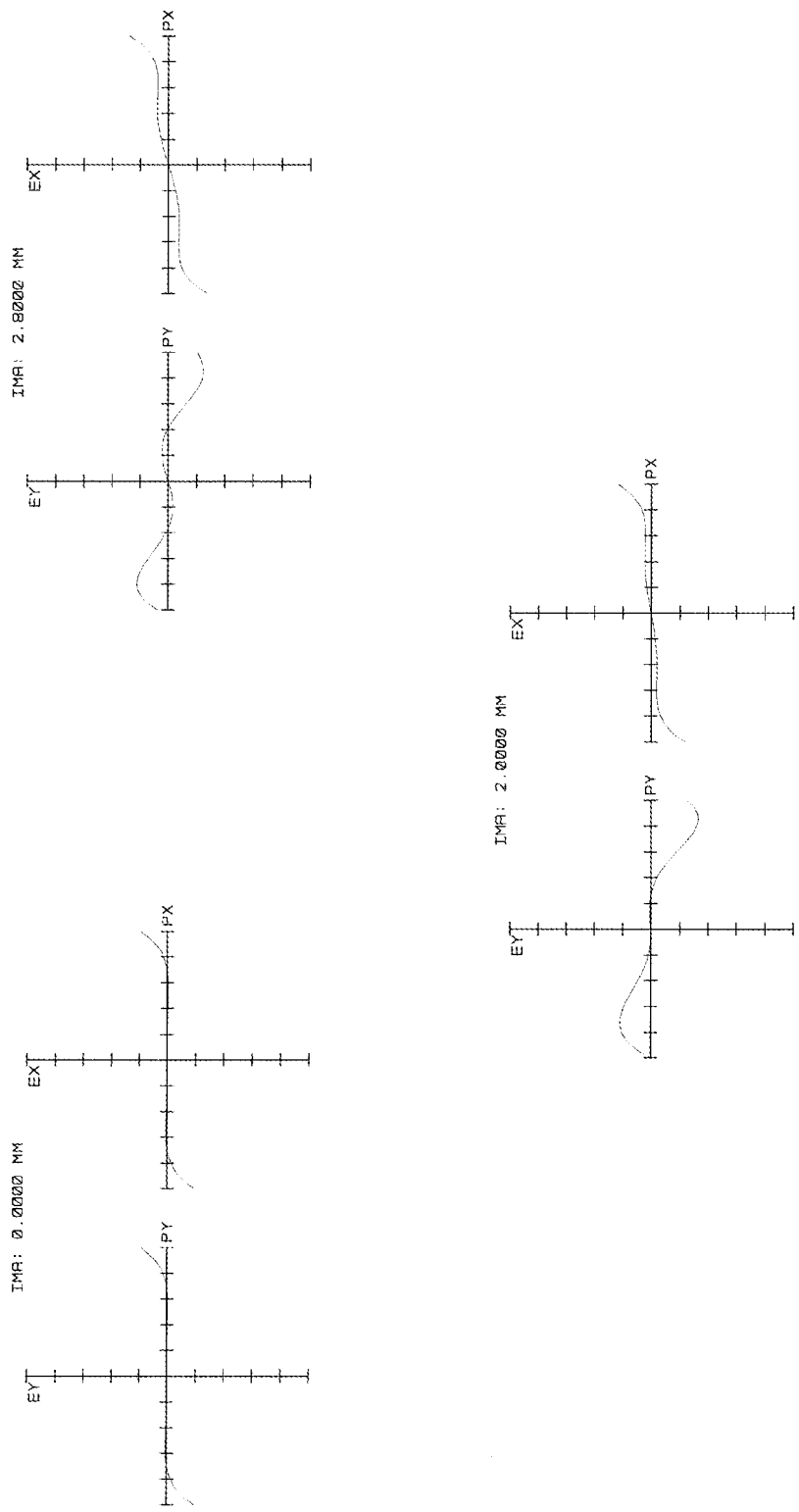

In FIG. 6A, it shows that the maximum field curvature is about 0.075 mm and −0.006 mm, and the maximum distortion is about −6.4%. In FIG. 6B, it shows that the maximum transverse chromatic aberration is about 9 μm. FIG. 6C shows that the maximum spherical aberration is about 0.07 mm and −0.03 mm. FIG. 6D shows that all the coma aberrations of the zoom lens 2 are acceptable.

Figure 7A:
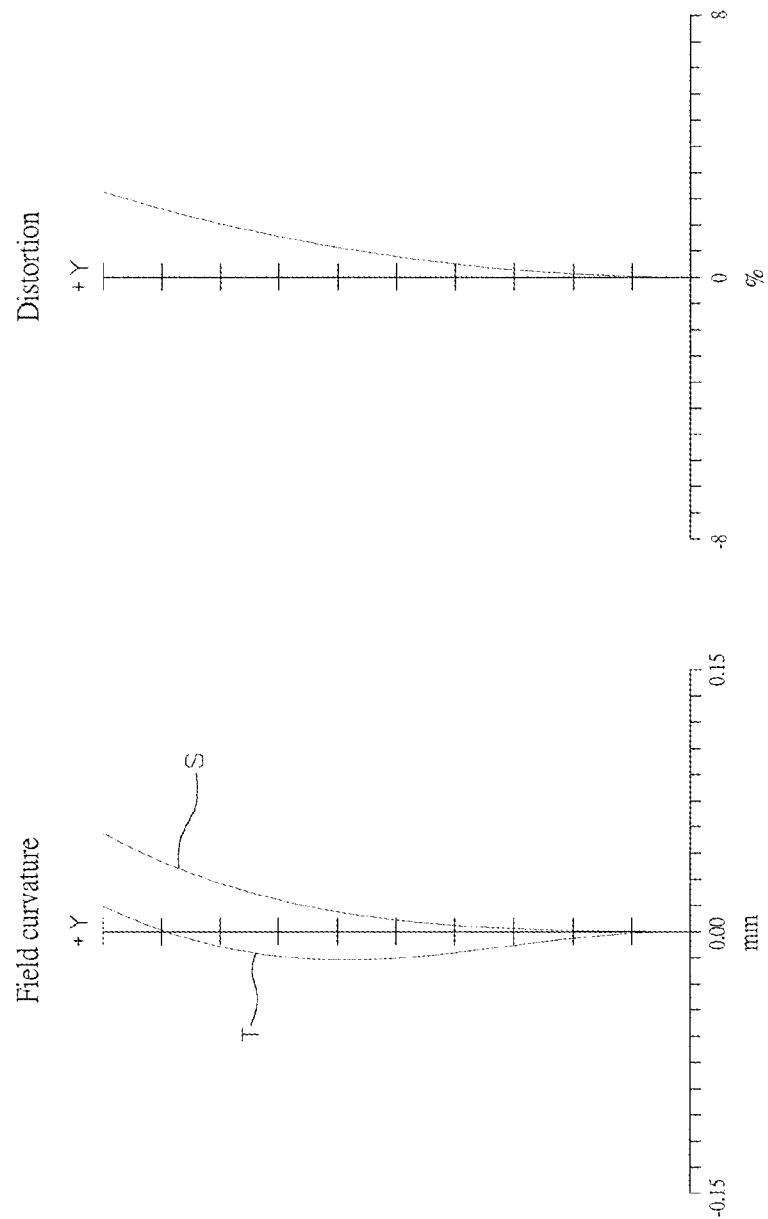
FIG. 7A is a field curvature diagram and a distortion diagram of the second preferred embodiment of the present invention in the middle mode.
Figure 7D:
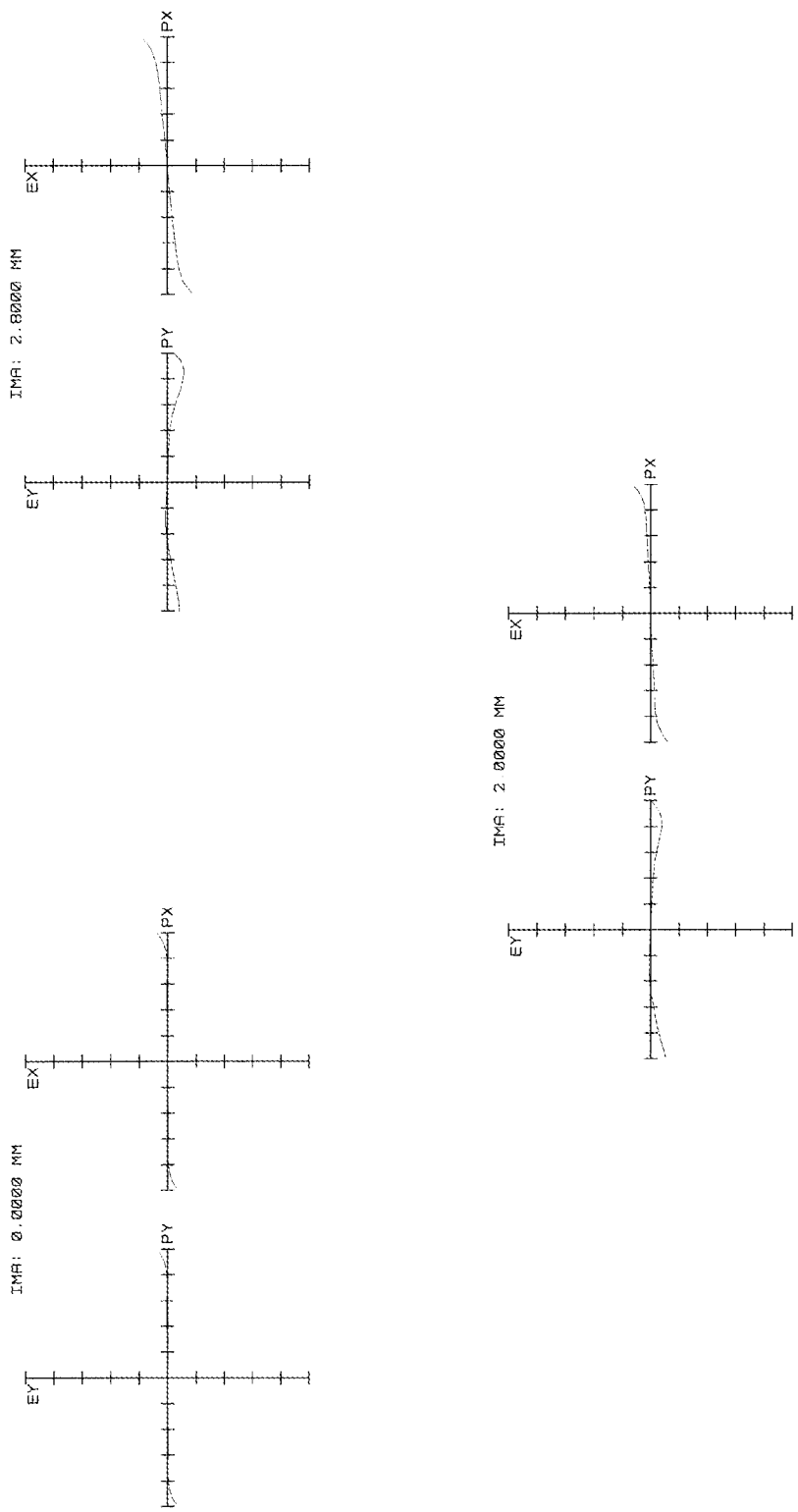
FIG. 7D is a coma aberration diagram of the second preferred embodiment of the present invention in the middle mode.

In the middle mode, the zoom lens 2 of the present invention has a good optical performance also. FIG. 7A shows the maximum field curvature is about 0.06 mm and −0.03 mm, and the maximum distortion is about 3.2%. In FIG. 7B, it shows that the maximum transverse chromatic aberration is about −0.3 μm. FIG. 7C shows that the maximum spherical aberration is about 0.08 mm and −0.03 mm. FIG. 7D shows that all the coma aberrations of the zoom lens 2 are acceptable.

Figure 8A:
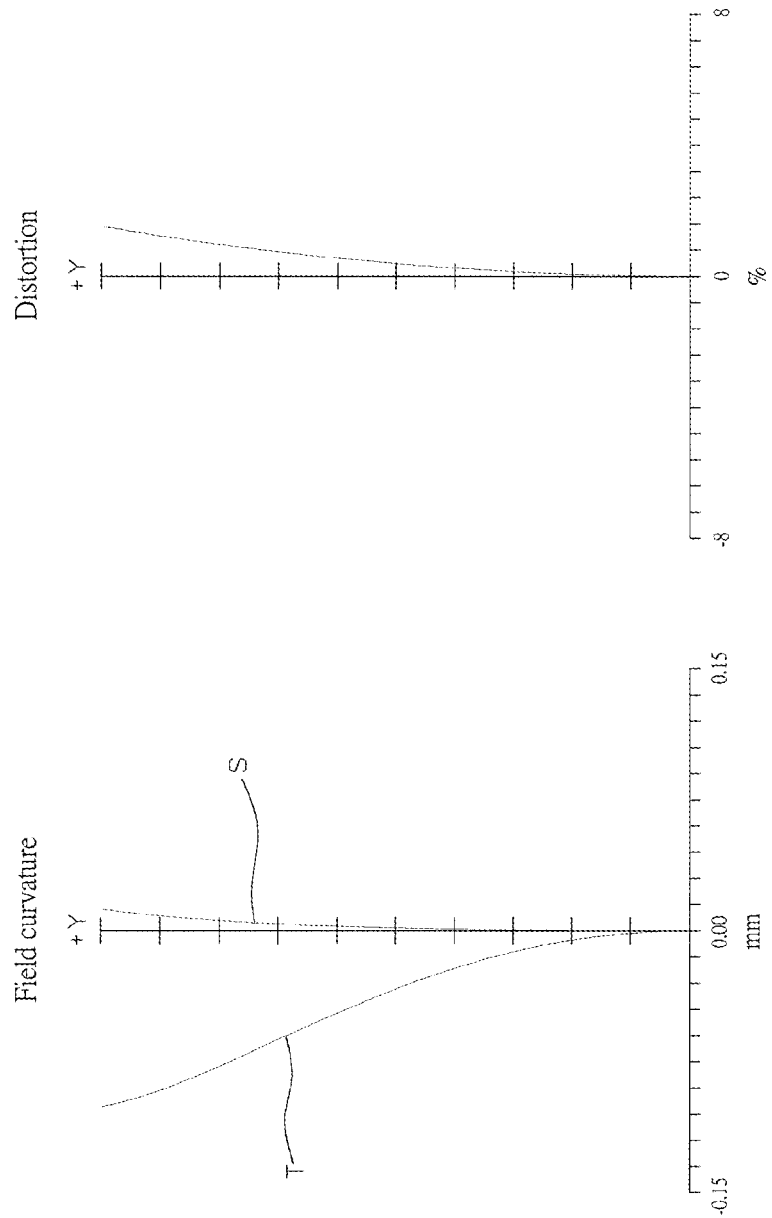
FIG. 8A is a field curvature diagram and a distortion diagram of the second preferred embodiment of the present invention in the telephoto mode.
Figure 8C:
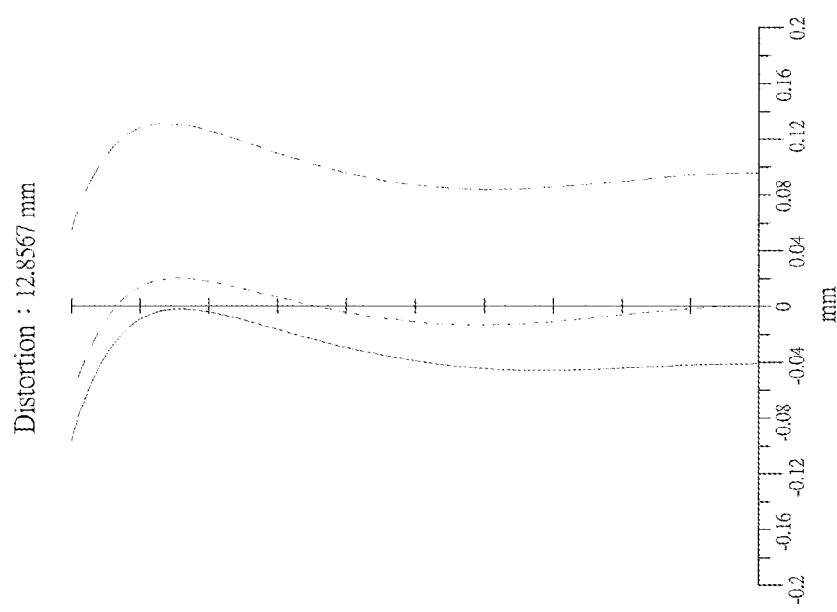
FIG. 8C is a spherical aberration diagram of the second preferred embodiment of the present invention in the telephoto mode.
Figure 8B:
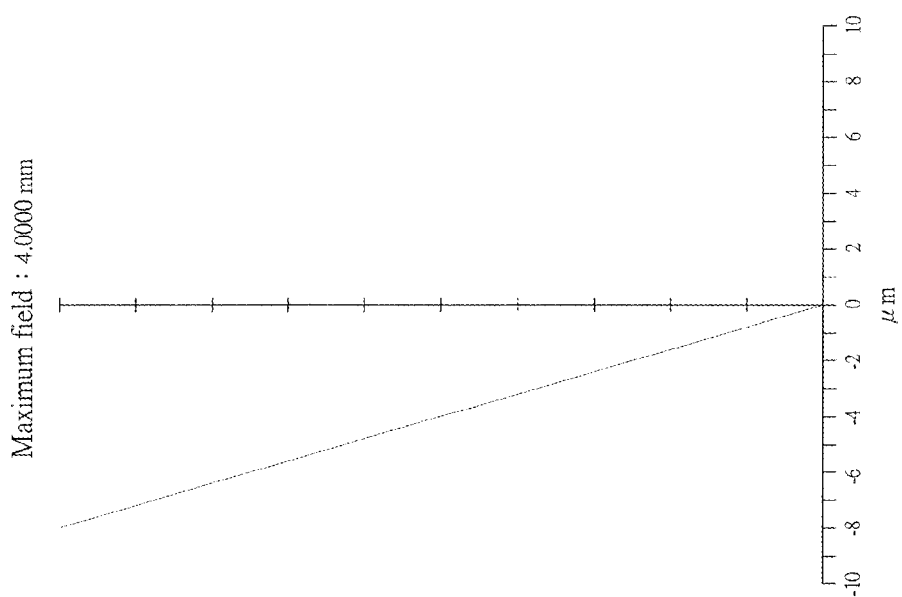
FIG. 8B is a transverse chromatic aberration diagram of the second preferred embodiment of the present invention in the telephoto mode.
Figure 8D:
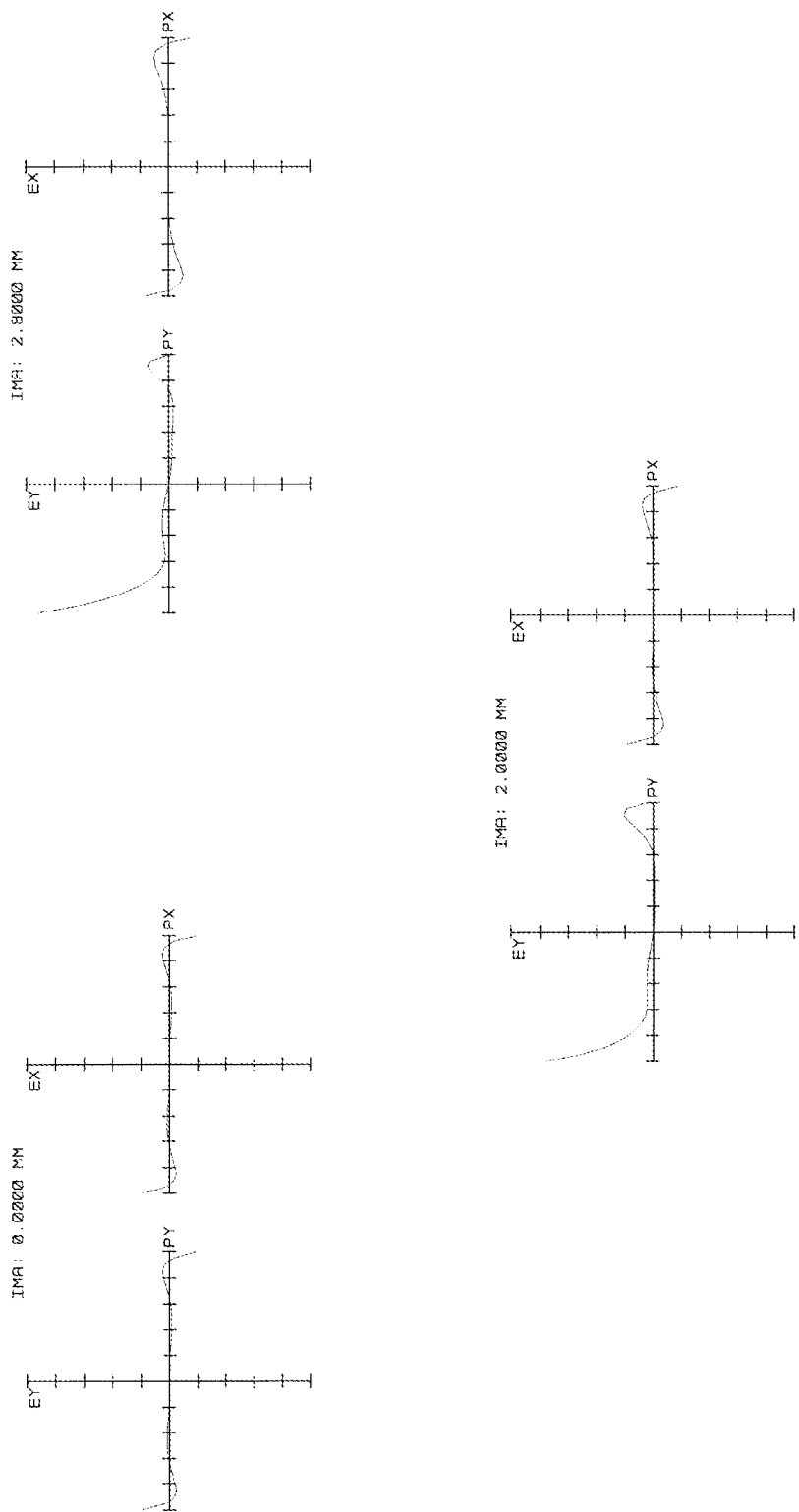
FIG. 8D is a coma aberration diagram of the second preferred embodiment of the present invention in the telephoto mode.

In the telephoto mode, FIG. 8A shows the maximum field curvature is about 0.015 mm and −0.105 mm, and the maximum distortion is about 1.6%. In FIG. 8B, it shows that the maximum transverse chromatic aberration is about −9 μm. FIG. 8C shows that the maximum spherical aberration is about 0.14 mm and −0.10 mm. FIG. 8D shows that all the coma aberrations of the zoom lens 2 are acceptable.

Third Preferred Embodiment

Figure 9:
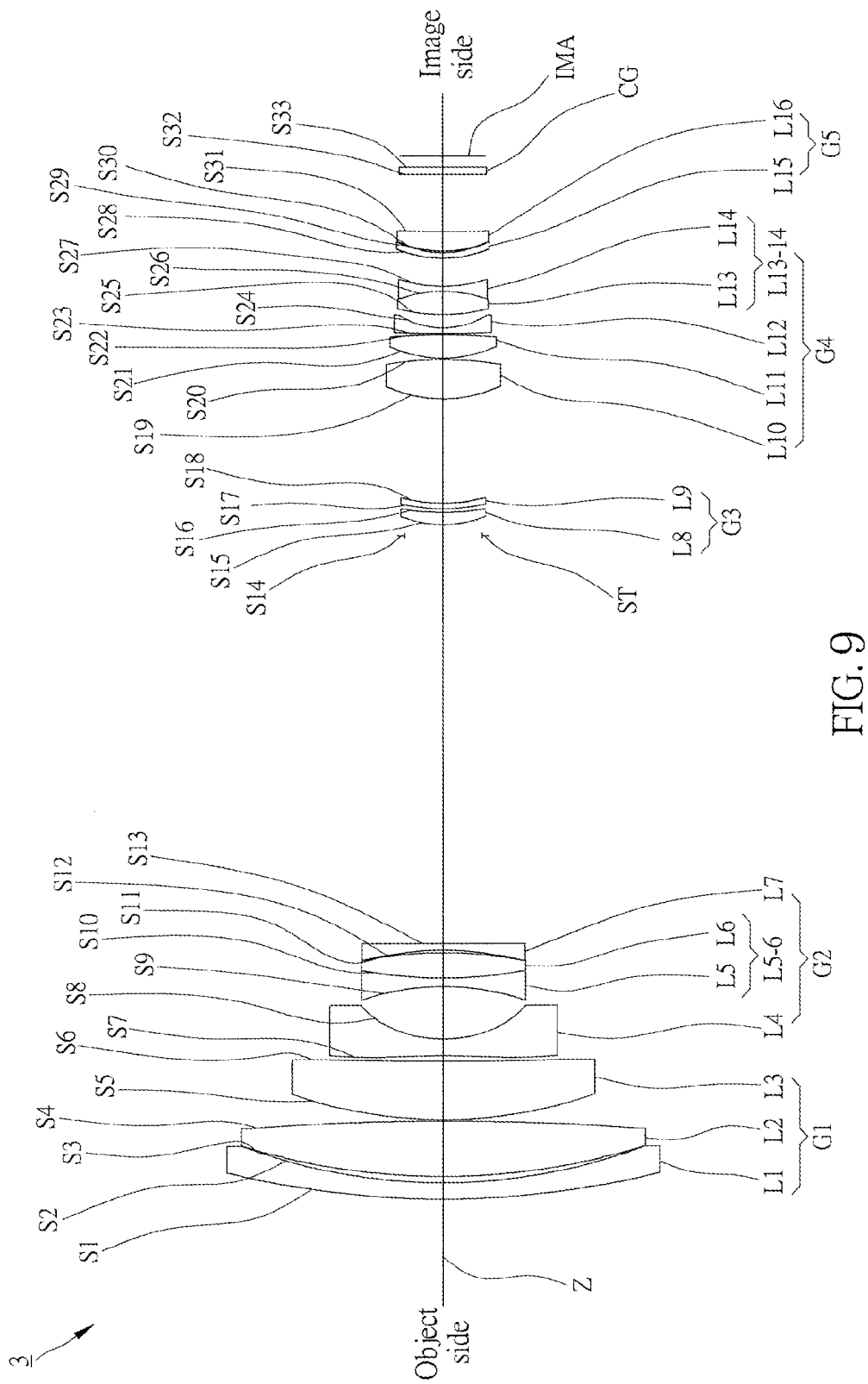
FIG. 9 is a sketch diagram of the arrangement of the lenses of a third preferred embodiment of the present invention.

FIG. 9 shows a zoom lens 3 of the third preferred embodiment of the present invention which includes, along an optical axis Z from an object side to an image side, a first lens group G1, a second lens group G2, an aperture ST, a third lens group G3, a fourth lens group G4, a fifth lens group G5, and an image surface IMA. It may be further provided with a cover glass CG between the fifth lens group G5 and the image surface IMA.

The first lens group G1 has positive refractive power and includes a first lens L1, a second lens L2, and a third lens L3 in order from the object side to the image side. The first lens L1 is a meniscus lens with negative refractive power, and its convex surface S1 faces the object side. The second lens L2 is a biconvex lens with positive refractive power. The third lens L3 is a meniscus lens with positive refractive power, and its convex surface S5 facing the object side.

The second lens group G2 has negative refractive power, and includes a fourth lens L4, a fifth lens L5, a sixth lens L6, and a seventh lens L7 in order from the object side to the image side. The fourth lens L4 is a biconcave lens with negative refractive power, and both of its concave surfaces S7 and S8 are aspheric surfaces. The fifth lens L5 is a biconcave lens with negative refractive power. The sixth lens L6 is a biconvex lens with positive refractive power. The fifth and sixth lenses L5 and L6 are coupled together to form a compound lens L5-6. The seventh lens L7 is a biconcave lens with negative refractive power, and its concave surface S12 is an aspheric surface and faces the object side.

The third lens group G3 has positive refractive power, and includes an eighth lens L8 and a ninth lens L9 in order from the object side to the image side. The eighth lens L8 is a meniscus lens with positive refractive power, and its convex surface S15 is an aspheric surface and faces the object side. The ninth lens L9 is a meniscus lens with negative refractive power, and its convex surface S17 faces the object side.

The fourth lens group G4 has positive refractive power and includes a tenth lens L10, an eleventh lens L11, a twelfth lens L12, a thirteenth lens L13, and a fourteenth lens L14 in order from the object side to the image side. The tenth lens L10 is a biconvex lens with positive refractive power, and both of its convex surfaces S19 and S20 are aspheric surfaces. The eleventh lens L11 is a biconvex lens with positive refractive power. The twelfth lens L12 is a meniscus lens with negative refractive power, and its convex surface S23 faces the object side. The thirteenth lens L13 is a biconvex lens with positive refractive power. The fourteenth lens L14 is a biconcave lens with negative refractive power. The thirteenth lens L13 and the fourteenth lens L14 are coupled together to form a compound lens S13-14.

The fifth lens group G5 has positive refractive power, and includes a fifteenth lens L15 and a sixteenth lens L16 in order from the object side to the image side. The fifteenth lens L15 is a meniscus lens with negative refractive power, and its convex surface S28 faces the object side. The sixteenth lens L16 is a meniscus lens with positive refractive power, and it has an aspheric surface S30 facing the object side.

The zoom lens 3 of the present invention may be switched to a wide-angle mode, a middle mode, and a telephoto mode by moving the first lens group G1, the second lens group G2, the third lens group G3, and the fourth lens group G4. The zoom lens 2 is switched to the telephoto mode from the wide-angle mode by moving the first lens group G1 toward the object side, moving the second lens group G2 toward the image side, moving the third lens group G3 toward the object side, and moving the fourth lens group G4 toward the object side that a distance between the first lens group G1 and the second lens group G2 increases, a distance between the second lens group G2 and the third lens group G3 decreases, and a distance between the third lens group G3 and the fourth lens group G4 decreases. In addition, the fifth lens group G5 is moved toward the object side when the zoom lens 3 of the present invention is focusing.

In order to obtain a good optical performance, the zoom lens 3 of the present invention has the following features:

$$fT/fW \geq 32 \qquad (1)$$

$$0.2 \leq (DG12 \cdot fW)/(fT \cdot Y) \leq 0.5 \qquad (2)$$

$$9 < |(MG2 \cdot Y)/fG2| \leq 13 \qquad (3)$$

$$0 < |M3T/M3W| \leq 0.7 \qquad (4)$$

$$0.75 < |M345T/M345W| \leq 6.0 \qquad (5)$$

wherein fT is the focus length of the zoom lens 1 in telephoto mode;

fW is the focus length of the zoom lens 1 in wide-angle mode;

DG12 is the difference of distance between the first lens group G1 and the second lens group G2 when the zoom lens 1 is switched to the telephoto mode from the wide-angle mode;

Y is a half of the maximum diagonal of the image surface IMA;

MG2 is the distance of movement of the second lens group G2 when the zoom lens 1 is switched to the telephoto mode from the wide-angle mode;

fG2 is the focus length of the second lens group G2;

M3T is the transverse zoom ratio of the third lens group G3 in the telephoto mode;

M3W is the transverse zoom ratio of the third lens group G3 in the wide-angle mode;

M345T is the sum of the transverse zoom ratios of the third lens group G3, the fourth lens group G4, and the fifth lens group G5 in the telephoto mode; and M345W is the sum of the transverse zoom ratios of the third lens group G3, the fourth lens group G4, and the fifth lens group G5 in the wide-angle mode.

The zoom lens 3 of the present invention will have the following specifications when it satisfies the above five features:

$$fT/fW=34.02 \qquad (1)$$

$$(DG12 \cdot fW)/(fT \cdot Y)=0.40 \qquad (2)$$

$$|(MG2 \cdot Y)/fG2|=11.72 \qquad (3)$$

$$|M3T/M3W|=0.64 \qquad (4)$$

$$|M345T/M345W|=0.87 \qquad (5)$$

The focus length (F), the half of the maximum diagonal of the image surface IMA (Y), the radius of curvature at the optical axis of each lens (R), the thickness at the optical axis of each lens (T), the refractive index (Nd), and the Abbe number (Vd) of the zoom lens 32 of the present invention is shown in Table 5.

TABLE 5

F = 4.45(W)~26.0(M)~151.4(T)
Y = 4 mm

| Surface | R (mm) | T (mm) | Nd | Vd | note |
|---|---|---|---|---|---|
| S1 | 83.840 | 1.500 | 1.903627 | 31.3 | L1 |
| S2 | 53.194 | 0.573 | | | |
| S3 | 63.014 | 5.100 | 1.438751 | 94.9 | L2 |
| S4 | −236.276 | 0.130 | | | |
| S5 | 42.873 | 5.390 | 1.497 | 81.5 | L3 |
| S6 | 458.523 | 0.497172(W)~32.32514(M)~54.88425(T) | | | |
| S7 | −56.812 | 1.530 | 1.859814 | 40.6 | L4 |
| S8 | 12.761 | 4.807 | | | |
| S9 | −23.712 | 0.800 | 1.651599 | 58.6 | L5 |
| S10 | 42.649 | 2.322 | 1.922869 | 18.9 | L6 |
| S11 | −38.848 | 0.240 | | | |
| S12 | −26.945 | 0.600 | 1.534613 | 56.1 | L7 |
| S13 | 3387.680 | 37.53963(W)~11.06515(M)~0.99802(T) | | | |
| S14 | | 1.00 | | | ST |
| S15 | 10.003 | 1.154 | 1.534613 | 56.1 | L8 |
| S16 | 23.841 | 0.339 | | | |
| S17 | 18.862 | 0.498 | 1.846667 | 23.8 | L9 |
| S18 | 15.080 | 9.577274(W)~3.596655(M)~0.596655(T) | | | |
| S19 | 11.767 | 1.154 | 1.534613 | 56.1 | L10 |
| S20 | −28.077 | 0.339 | | | |
| S21 | 11.673 | 0.498 | 1.487491 | 70.2 | L11 |
| S22 | −59.464 | 1.154 | | | |
| S23 | 103.871 | 0.339 | 1.846667 | 23.8 | L12 |
| S24 | 7.600 | 0.498 | | | |
| S25 | 17.625 | 1.154 | 1.672704 | 32.1 | L13 |
| S26 | −11.453 | 0.339 | 1.640001 | 60.1 | L14 |
| S27 | 13.482 | 2.583758(W)~11.32764(M)~22.74005(T) | | | |
| S28 | 12.010 | 0.500 | 1.846667 | 23.8 | L15 |
| S29 | 9.551 | 0.126 | | | |
| S30 | 10.439 | 1.801 | 1.534613 | 56.1 | L16 |
| S31 | 92.949 | 5.250872(W)~10.94388(M)~3.28818(T) | | | |
| S32 | INF | 0.72 | 1.516332 | 64.1 | CG |
| S33 | INF | 1.00 | | | |

In the column T of Table 5, W indicates the distance between two neighboring surfaces in the optical axis in the wide-angle mode;
M indicates the distance between two neighboring surfaces in the optical axis in the middle mode;
T indicates the distance between two neighboring surfaces in the optical axis in the telephoto mode.

The depression z of the aspheric surfaces S7, S8, S12, S15, S19, S20, and S30 may be obtained by the following equation:

$$z = \frac{ch^2}{1+[1-(k+1)c^2h^2]^{\frac{1}{2}}} + Ah^4 + Bh^6 + Ch^8 + Dh^{10} + Eh^{12}$$

wherein
z is the depression of the aspheric surface;
c is the reciprocal of radius of curvature;
h is the radius of aperture on the surface;
k is conic constant;
AE are coefficients of the radius of aperture h.

The conic constants of the aspheric surfaces and the coefficients AE are shown in Table 6.

TABLE 6

|     | K | A | B | C | D | E |
| --- | --- | --- | --- | --- | --- | --- |
| S7  | −4.99994E+01 | 1.05027E−04 | −4.75420E−07 | 1.68605E−09 | −8.09464E−12 | −7.02822E−15 |
| S8  | −5.26741E+00 | 4.36089E−04 | −3.60299E−06 | 3.47899E−08 | 1.01163E−09 | −1.29588E−11 |
| S12 | 0 | 9.28291E−07 | −5.57361E−07 | 3.57290E−08 | −3.08592E−10 | 0 |
| S15 | 0 | −6.35435E−05 | −1.37308E−06 | 4.40244E−09 | 0 | 0 |
| S19 | 0 | −1.95787E−04 | 4.18868E−06 | −8.24362E−08 | −4.76387E−10 | 0 |
| S20 | 0 | 1.44936E−05 | 5.44370E−06 | −1.50755E−07 | 4.57925E−10 | 0 |
| S30 | 0 | 1.60887E−05 | 1.24271E−06 | −1.07112E−08 | 0 | 0 |

The lenses and the apertures ST as described above may reduce the size of the zoom lens 3 of the present invention. The zoom lens 3 still has a good optical performance in the wide-angle mode as shown in FIG. 10A to FIG. 10D.

Figure 10A:
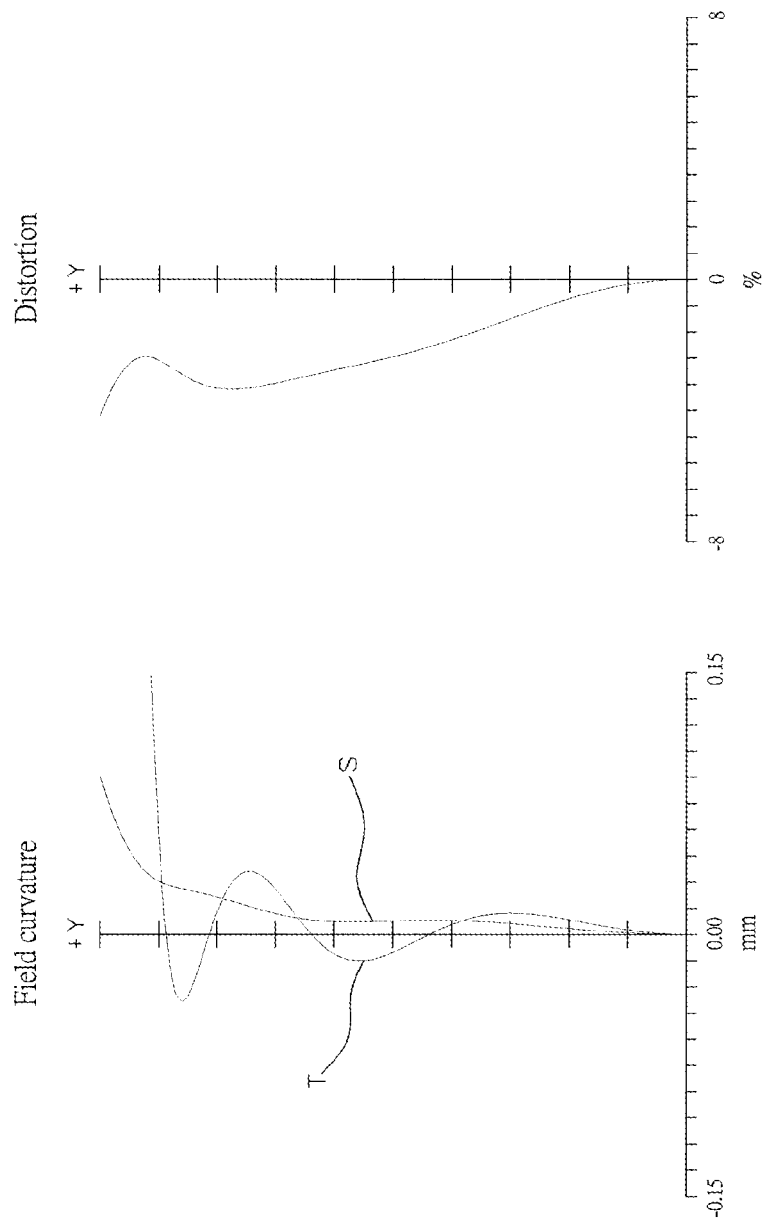
FIG. 10A is a field curvature diagram and a distortion diagram of the third preferred embodiment of the present invention in the wide-angle mode.
Figures 10B, 10C:
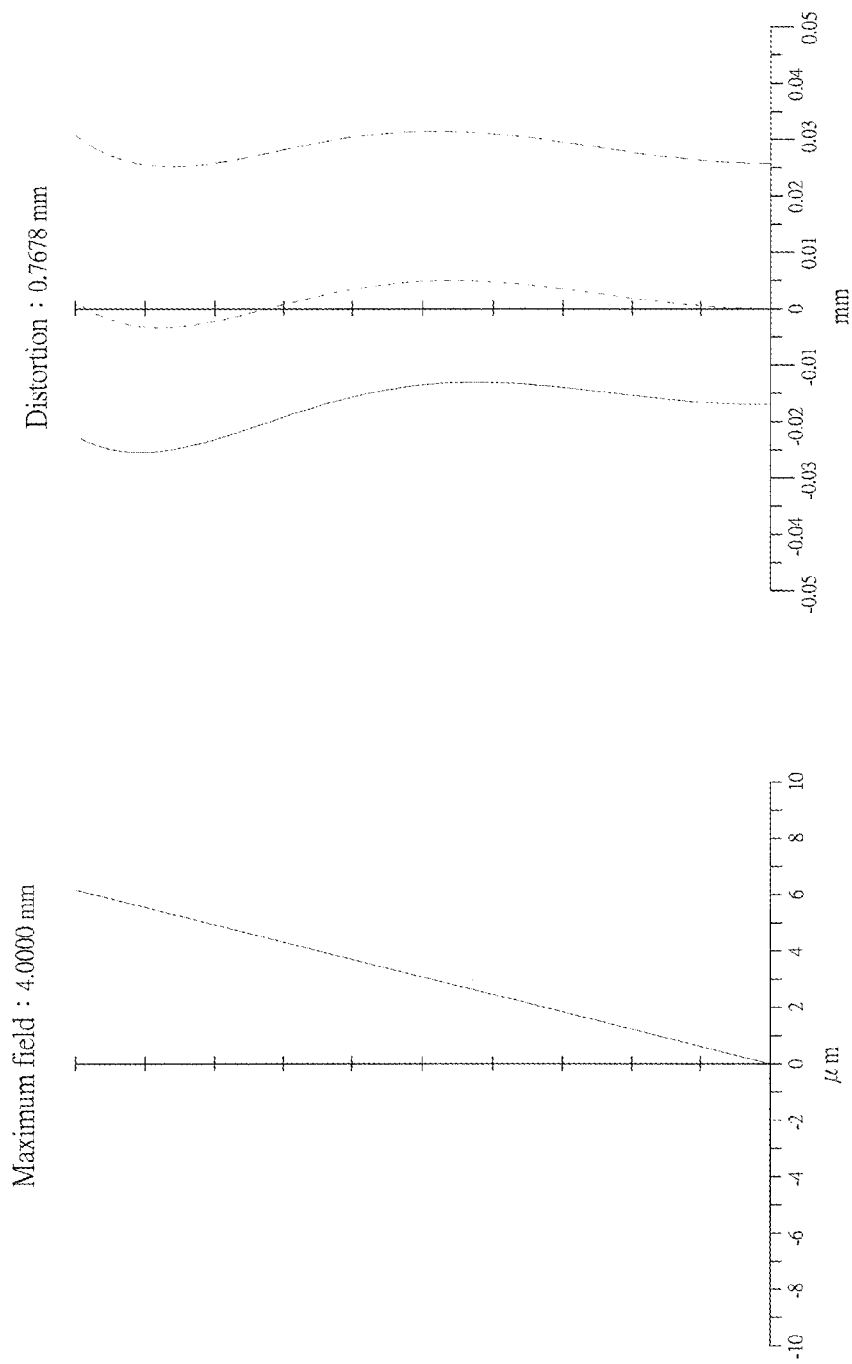
FIG. 10B is a transverse chromatic aberration diagram of the third preferred embodiment of the present invention in the wide-angle mode.
FIG. 10C is a spherical aberration diagram of the third preferred embodiment of the present invention in the wide-angle mode.
Figure 10D:
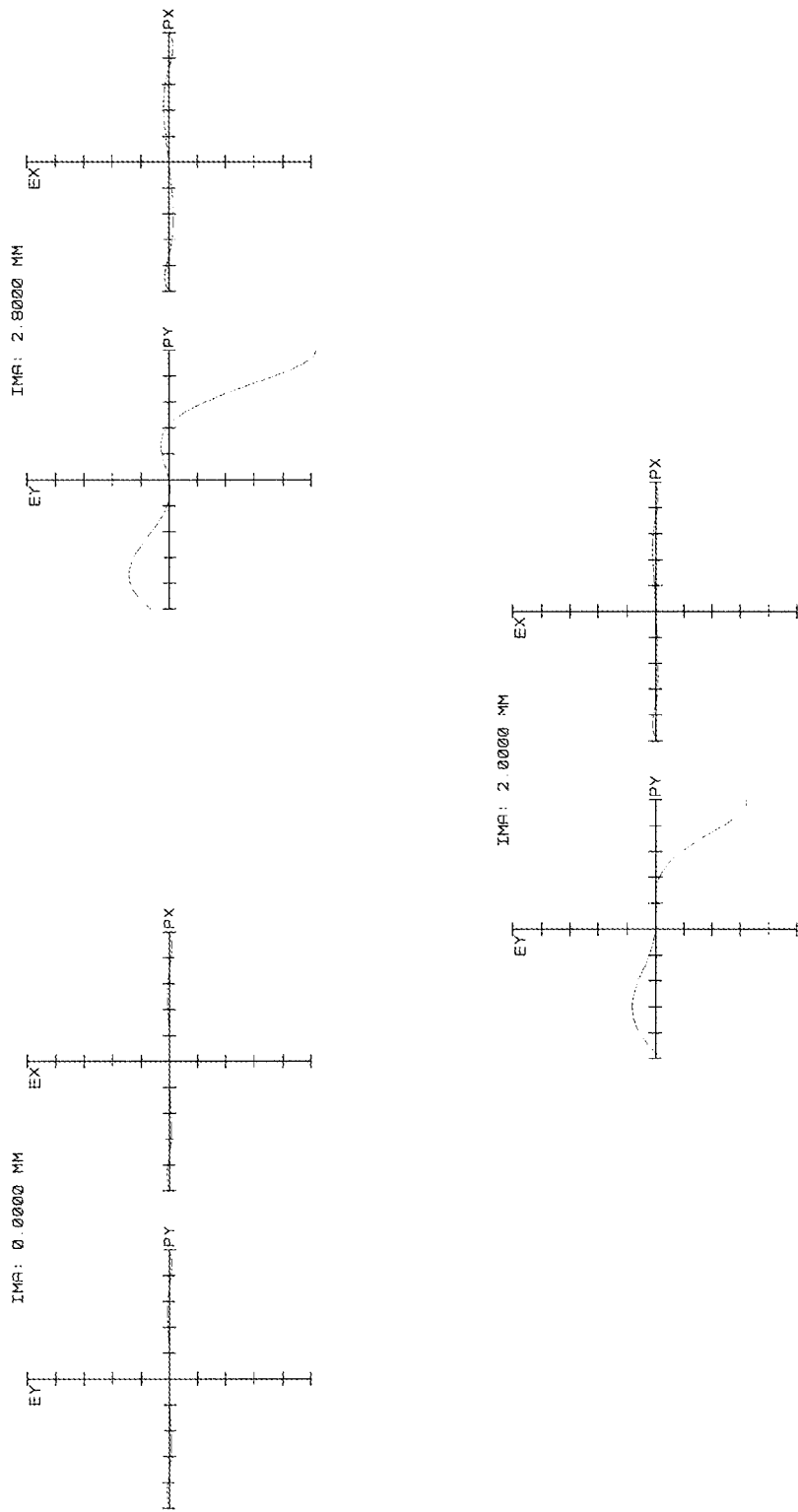
FIG. 10D is a coma aberration diagram of the third preferred embodiment of the present invention in the wide-angle mode.

In FIG. 10A, it shows that the maximum field curvature is about 0.15 mm and −0.045 mm, and the maximum distortion is about −4.8%. In FIG. 10B, it shows that the maximum transverse chromatic aberration is about 7 μm. FIG. 10C shows that the maximum spherical aberration is about 0.035 mm and −0.025 mm. FIG. 10D shows that all the coma aberrations of the zoom lens 3 are acceptable.

Figure 11A:
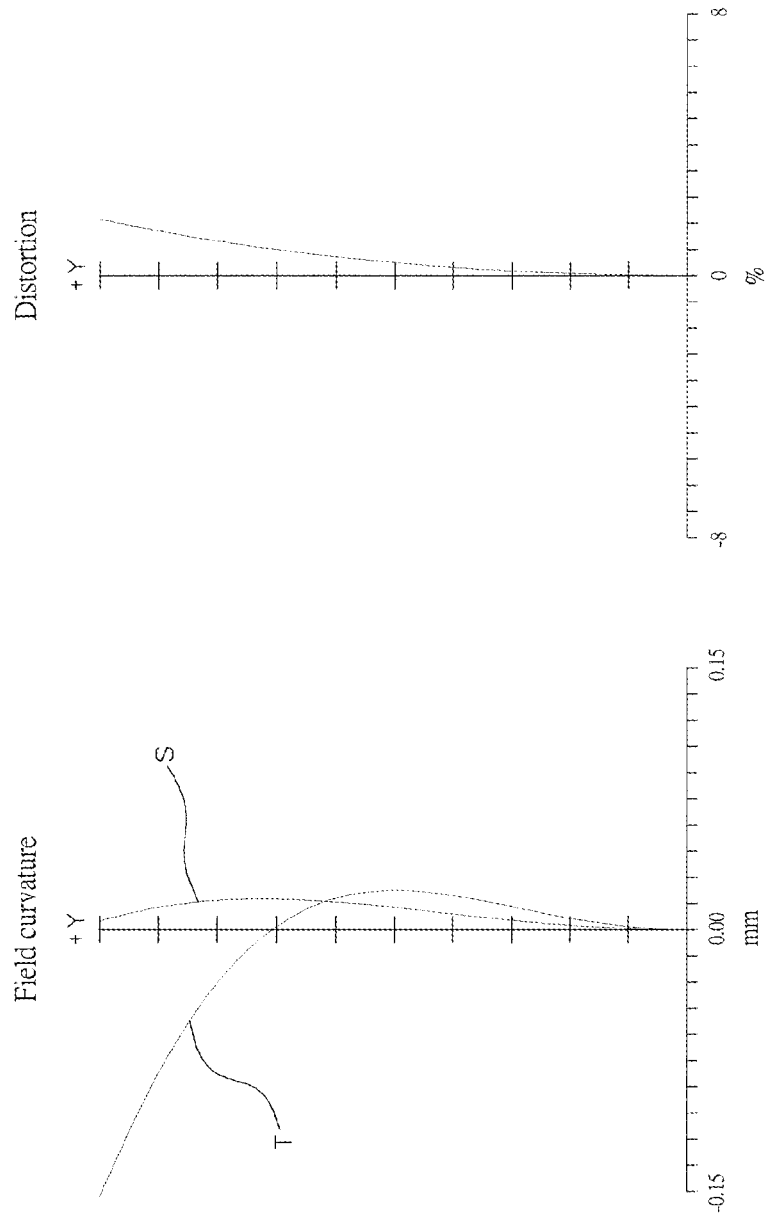
FIG. 11A is a field curvature diagram and a distortion diagram of the third preferred embodiment of the present invention in the middle mode.
Figures 11B, 11C:
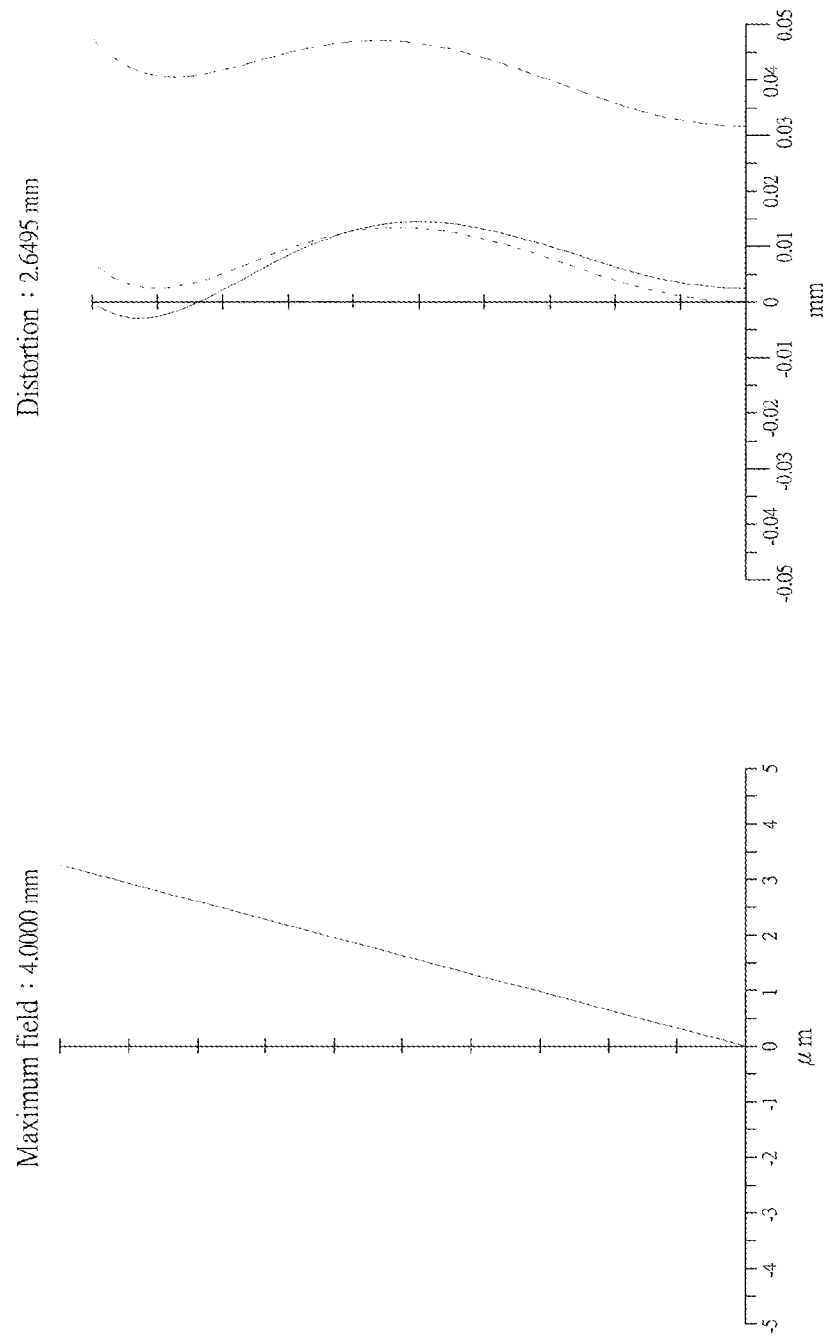
FIG. 11B is a transverse chromatic aberration diagram of the third preferred embodiment of the present invention in the middle mode.
FIG. 11C is a spherical aberration diagram of the third preferred embodiment of the present invention in the middle mode.
Figure 11D:
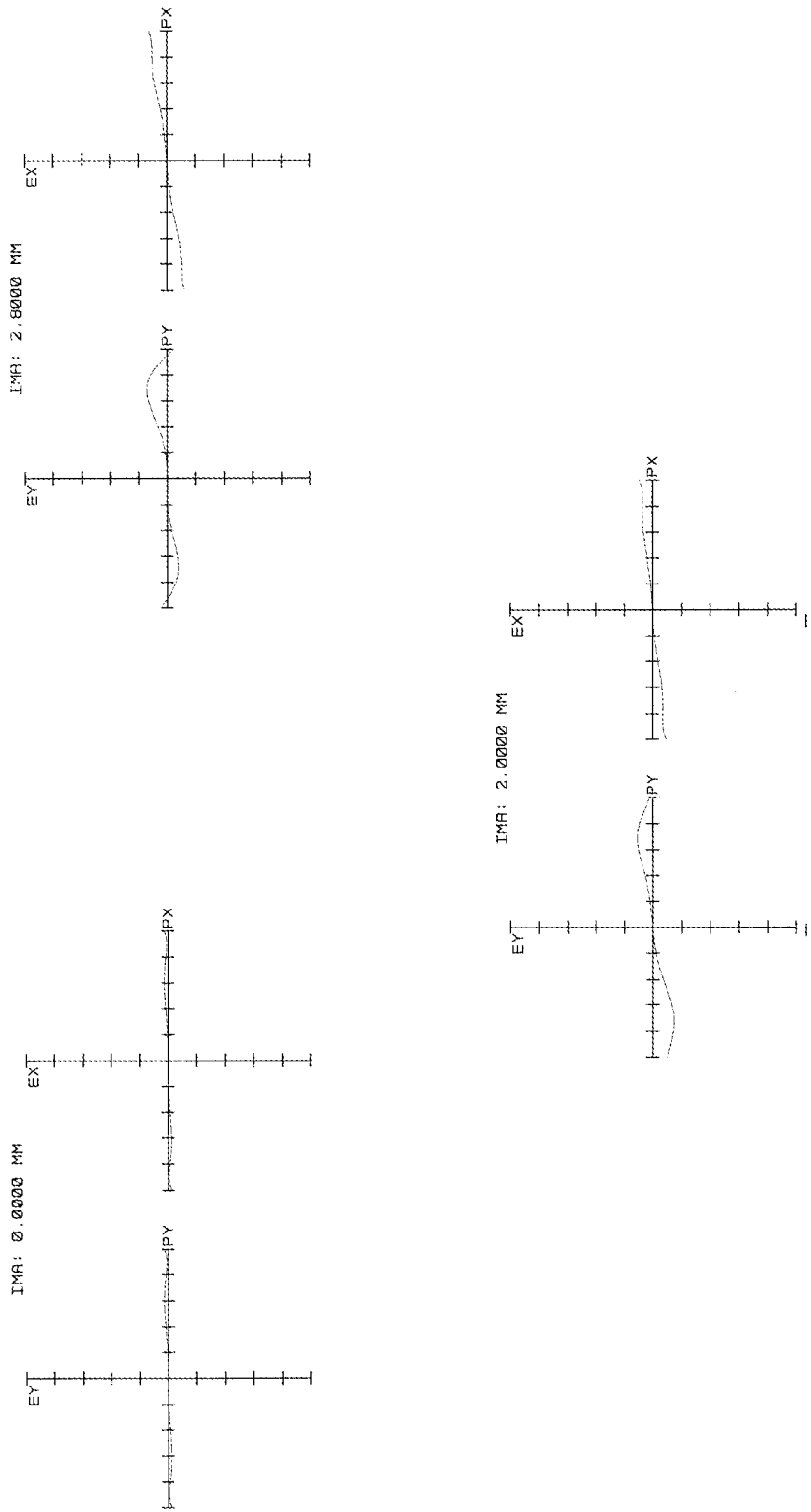
FIG. 11D is a coma aberration diagram of the third preferred embodiment of the present invention in the middle mode.

In the middle mode, the zoom lens 3 of the present invention has a good optical performance also. FIG. 11A shows the maximum field curvature is about 0.03 mm and −0.15 mm, and the maximum distortion is about 2.4%. In FIG. 11B, it shows that the maximum transverse chromatic aberration is about −3.5 μm. FIG. 11C shows that the maximum spherical aberration is about 0.05 mm and −0.005 mm. FIG. 11D shows that all the coma aberrations of the zoom lens 3 are acceptable.

Figure 12A:
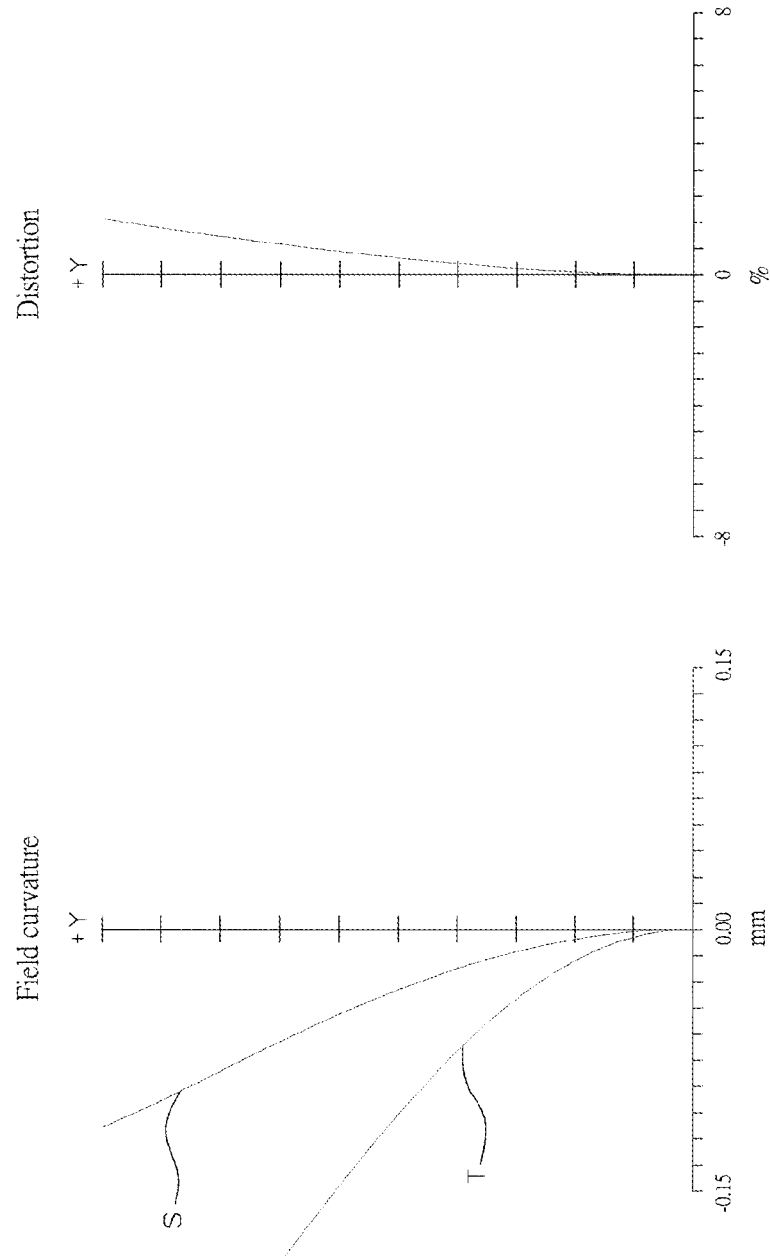
FIG. 12A is a field curvature diagram and a distortion diagram of the third preferred embodiment of the present invention in the telephoto mode.
Figure 12D:
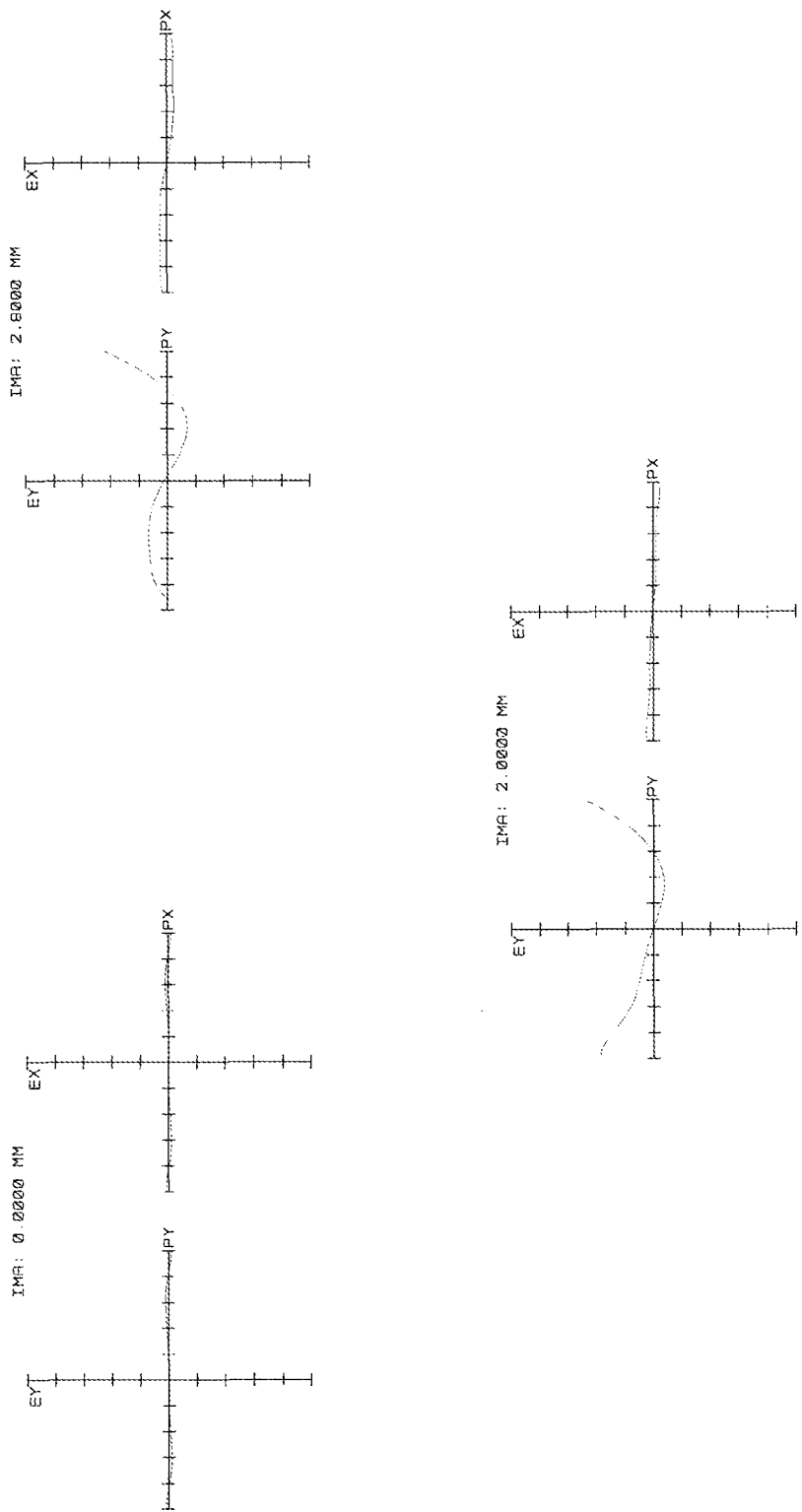
FIG. 12D is a coma aberration diagram of the third preferred embodiment of the present invention in the telephoto mode.

In the telephoto mode, FIG. 12A shows the maximum field curvature is about 0.015 mm and −0.15 mm, and the maximum distortion is about 2.4%. In FIG. 12B, it shows that the maximum transverse chromatic aberration is about −12 μm. FIG. 12C shows that the maximum spherical aberration is about 0.14 mm and −0.12 mm. FIG. 12D shows that all the coma aberrations of the zoom lens 3 are acceptable.

In conclusion, the zoom lens of the present invention has the features of small size, high zoom ratio, and high optical performance.

The description above is a few preferred embodiments of the present invention and the equivalence of the present invention is still in the scope of claim construction of the present invention.

What is claimed is:

1. A zoom lens, in order along an optical axis from an object side to an image side, comprising:

a first lens group having positive refractive power, and including three lenses, wherein two lenses of the first lens group have positive refractive power;

a second lens group having negative refractive power, and including four lenses, wherein at least one lens of the second lens group has an aspheric surface;

an aperture;

a third lens group having positive refractive power, and including two lenses, wherein one lens of the third lens group has positive refractive power;

a fourth lens group having positive refractive power, and including five lenses, wherein three lenses of the fourth lens group have positive refractive power, and a fifth lens group having positive refractive power, and including two lenses, wherein one lens of the fifth lens group has positive refractive power.

2. The zoom lens as defined in claim 1, wherein the three lenses of the first lens group from the object side to the image side respectively have negative refractive power, positive refractive power, and positive refractive power.

3. The zoom lens as defined in claim 1, wherein the first and the second lenses of the first lens group from the object side are coupled together to form a compound lens.

4. The zoom lens as defined in claim 1, wherein the four lenses of the second lens group from the object side to the image side respectively have negative refractive power, negative refractive power, positive refractive power, and negative refractive power.

5. The zoom lens as defined in claim 1, wherein the first lens of the second lens group from the object side has at least an aspheric surface.

6. The zoom lens as defined in claim 1, wherein the second and the third lenses of the second lens group from the object side are coupled together to form a compound lens.

7. The zoom lens as defined in claim 1, wherein the fourth lens of the second lens group from the object side has at least an aspheric surface.

8. The zoom lens as defined in claim 1, wherein the two lenses of the third lens group from the object side to the image side respectively have positive refractive power and negative refractive power.

9. The zoom lens as defined in claim 1, wherein the first lens of the third lens group from the object side has at least an aspheric surface.

10. The zoom lens as defined in claim 1, wherein the five lenses of the fourth lens group from the object side to the image side respectively have positive refractive power, positive refractive power, negative refractive power, positive refractive power, and negative refractive power.

11. The zoom lens as defined in claim 1, wherein the first lens of the fourth lens group from the object side has at least an aspheric surface.

12. The zoom lens as defined in claim 1, wherein the fourth and the fifth lenses of the fourth lens group from the object side are coupled together to form a compound lens.

13. The zoom lens as defined in claim 1, wherein the two lenses of the fifth lens group from the object side to the image side respectively have negative refractive power and positive refractive power.

14. The zoom lens as defined in claim 1, wherein the second lens of the fifth lens group from the object side has at least an aspheric surface.

15. The zoom lens as defined in claim 1, wherein the fifth lens group is moved toward the object side when the zoom lens is focusing.

16. The zoom lens as defined in claim 1, wherein the zoom lens satisfies a feature of fT/fW≥32, wherein fT is a focus length of the zoom lens in the telephoto mode, and fW is a focus length of the zoom lens in the wide-angle mode.

17. The zoom lens as defined in claim 1, wherein the zoom lens satisfies a feature of 0.2≤(DG12·fW)/(fT·Y)≤0.5, wherein fT is a focus length of the zoom lens in the telephoto mode; fW is a focus length of the zoom lens in the wide-angle mode; DG12 is a difference of a distance between the first lens group and the second lens group when the zoom lens is switched to the telephoto mode from the wide-angle mode; and Y is a half of a maximum diagonal of the image surface.

18. The zoom lens as defined in claim 1, wherein the zoom lens satisfies a feature of 9<|(MG2·Y)/fG2|≤13, wherein MG2 is a distance of movement of the second lens group when the zoom lens is switched to the telephoto mode from the wide-angle mode; Y is a half of a maximum diagonal of the image surface; and fG2 is a focus length of the second lens group.

19. The zoom lens as defined in claim 1, wherein the zoom lens satisfies a feature of 0<|M3T/M3W|≤0.7, wherein M3T is a transverse zoom ratio of the third lens group in the telephoto mode; and M3W is a transverse zoom ratio of the third lens group in the wide-angle mode.

20. The zoom lens as defined in claim 1, wherein the zoom lens satisfies a feature of 0.75≤|M345T/M345W|≤6.0, wherein M345T is a sum of transverse zoom ratios of the third lens group, the fourth lens group, and the fifth lens group in the telephoto mode; and M345W is a sum of transverse zoom ratios of the third lens group, the fourth lens group, and the fifth lens group in the wide-angle mode.

21. The zoom lens as defined in claim 1, wherein the first, third and fourth lens groups move toward the object side, the second lens group moves toward the image side, and a distance between the third lens group and the fourth lens group decreases while the zoom lens switches from a wide-angle mode to a telephoto mode.

* * * * *